US009264800B2

(12) United States Patent
Okimoto et al.

(10) Patent No.: US 9,264,800 B2
(45) Date of Patent: Feb. 16, 2016

(54) AUDIO SIGNAL PROCESSING APPARATUS AND AUDIO SIGNAL PROCESSING METHOD

(75) Inventors: Koyuru Okimoto, Tokyo (JP); Yuji Yamada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 504 days.

(21) Appl. No.: 13/109,166

(22) Filed: May 17, 2011

(65) Prior Publication Data

US 2011/0301731 A1 Dec. 8, 2011

(30) Foreign Application Priority Data

Jun. 2, 2010 (JP) .............................. P2010-126798

(51) Int. Cl.

*G06F 17/00* (2006.01)
*H04R 3/00* (2006.01)
*H04R 5/04* (2006.01)
*H04R 3/04* (2006.01)
*H04S 7/00* (2006.01)

(52) U.S. Cl.

CPC .. *H04R 3/00* (2013.01); *H04R 5/04* (2013.01); *H04R 3/04* (2013.01); *H04S 7/305* (2013.01)

(58) Field of Classification Search

CPC ................................. H04R 3/04; H04S 7/305
USPC ........................................................... 700/94
See application file for complete search history.

(56) References Cited

U.S. PATENT DOCUMENTS

| | | | | |
|---|---|---|---|---|
| 6,674,864 | B1 * | 1/2004 | Kitamura | 381/103 |
| 2008/0130917 | A1 * | 6/2008 | Kong et al. | 381/107 |
| 2008/0279318 | A1 * | 11/2008 | Bharitkar et al. | 375/350 |
| 2009/0225996 | A1 * | 9/2009 | Brooking | 381/59 |
| 2011/0066263 | A1 * | 3/2011 | Iwai | 700/94 |

FOREIGN PATENT DOCUMENTS

| | | |
|---|---|---|
| JP | 2009-55079 | 3/2009 |

* cited by examiner

*Primary Examiner* — Joseph Saunders, Jr.
(74) *Attorney, Agent, or Firm* — Hazuki International, LLC

(57) ABSTRACT

An audio signal processing apparatus includes a signal processing unit, an output unit, a retention unit, and a coefficient setting unit. The signal processing unit is configured to perform signal processing on an audio signal by a digital filter. The output unit is configured to be connected to an external speaker and output the audio signal to the speaker. The retention unit is configured to retain a plurality of filter coefficients that are impulse responses having reverse characteristics of a plurality of speakers having different speaker characteristics. The coefficient setting unit is configured to select one of the filter coefficients that corresponds to the speaker connected to the output unit from the retention unit and set the filter coefficient in the digital filter.

9 Claims, 21 Drawing Sheets

AUDIO SIGNAL PROCESSING APPARATUS AND AUDIO SIGNAL PROCESSING METHOD

BACKGROUND

The present disclosure relates to an audio signal processing apparatus and an audio signal processing method that perform correction processing on audio signals to correct speaker characteristics.

In devices that perform audio signal processing, such as acoustic devices (hereinafter, referred to as audio signal processing devices), there are techniques in which correction processing such as digital filter processing is performed on an audio signal acquired from a sound source. The audio signal processing device outputs an audio signal that has been subjected to correction processing from a speaker or the like, thus being capable of improving a sound quality of the audio output from the speaker or the like, acoustic effects, or the like.

Examples of such correction processing include correction of "speaker characteristics". The speaker characteristics refer to frequency characteristics of a speaker, which differ depending on a bore or the like of a speaker or an internal structure thereof. Here, the frequency characteristics refer to phase characteristics as deviation in time between phases of an audio signal input to the speaker and an audio signal output from the speaker, amplitude characteristics as an intensity ratio, or the like.

Examples of the audio signal processing device capable of correcting speaker characteristics by performing correction processing on an audio signal include a "signal processing apparatus" disclosed in Japanese Patent Application Laid-open No. 2009-55079 (paragraph [0034], FIG. 1; hereinafter, referred to as Patent Document 1), for example. This signal processing apparatus is intended to improve low-level components of a compact speaker by combining amplification of a low-frequency band signal of an input audio signal and its shift to a high frequency band.

SUMMARY

However, as in the signal processing apparatus disclosed in Patent Document 1, the correction processing of enhancing the preset frequency band can be applied only to the case where a type of speaker to be connected, that is, speaker characteristics are specified. Examples of the audio signal processing device include a device that is not integrally formed with a speaker and to which a user connects any speaker. In such a case, even when an audio signal is subjected to stereotypical correction processing irrespective of the type of a speaker, effects to be obtained are limited or opposite effects are caused.

Particularly in recent years, portable music reproduction devices or the like are widely used and users have increasing opportunities to connect such a device to an optional speaker. For example, there is widely used a docking speaker or the like, with which a portable music reproduction device capable of outputting audio from a headphone is docked to thereby output audio from a speaker. In such a case, speaker characteristics of the speaker to be connected to the audio signal processing apparatus vary.

In view of the circumstances as described above, it is desirable to provide an audio signal processing apparatus and an audio signal processing method that are capable of performing correction processing corresponding to speaker characteristics of a speaker to be connected on an audio signal.

According to an embodiment of the present disclosure, there is provided an audio signal processing apparatus including a signal processing unit, an output unit, a retention unit, and a coefficient setting unit.

The signal processing unit is configured to perform signal processing on an audio signal by a digital filter.

The output unit is configured to be connected to an external speaker and output the audio signal to the speaker.

The retention unit is configured to retain a plurality of filter coefficients that are impulse responses having reverse characteristics of a plurality of speakers having different speaker characteristics.

The coefficient setting unit is configured to select one of the filter coefficients that corresponds to the speaker connected to the output unit from the retention unit and set the filter coefficient in the digital filter.

According to the embodiment of the present disclosure, the filter coefficients that are impulse responses having reverse characteristics of a plurality of speakers having different speaker characteristics are retained in the retention unit in advance. The impulse response of the speaker can be measured by supplying an impulse signal to the speaker and collecting output audio by a microphone, and the reverse characteristic of the speaker can be obtained from the measured impulse response. The impulse response having the reverse characteristic is set as a filter coefficient so as to impart the reverse characteristic to an audio signal, and therefore speaker characteristics of the speaker corresponding to that filter coefficient can be corrected. When a speaker is connected to the output unit, the coefficient setting unit selects a filter coefficient corresponding to that speaker. The coefficient setting unit sets the filter coefficient in the digital filter of the signal processing unit. Accordingly, in the digital filter of the signal processing unit, an audio signal is subjected to the signal processing corresponding to the speaker connected to the output unit and output from the output unit to that speaker. As described above, the audio signal processing apparatus can perform correction processing corresponding to speaker characteristics of a speaker connected to the output unit on an audio signal.

The retention unit may further retain a coefficient length of each of the filter coefficients that corresponds to a reproducible frequency band of the plurality of speakers, and the coefficient setting unit may refer to the coefficient length to set the filter coefficient in the digital filter.

The speaker has a lowest resonance frequency determined based on the structure thereof, and it is difficult for the speaker to properly output audio having a frequency equal to or lower than the lowest resonance frequency. Therefore, in the correction processing by the digital filter, it is suitable not to correct a frequency equal to or lower than the lowest resonance frequency. Here, a frequency band to be corrected is determined by a coefficient length as the number of filter coefficients. In other words, by setting the filter coefficient to have a coefficient length corresponding to a reproducible frequency band of a speaker, it is possible to perform correction processing only on the reproducible frequency band of the speaker. Further, since a coefficient length used for correcting a frequency band equal to or lower than a lowest resonance frequency of a speaker is unnecessary, it is also possible to reduce a computation amount by the signal processing unit.

The retention unit may further retain channel setting information that corresponds to each of the plurality of speakers and indicates whether the filter coefficients are different between channels, and the coefficient setting unit may refer to the channel setting information to set the filter coefficient in the digital filter.

There is conceivable a case where some speakers are stereo (two channels) having a left channel and a right channel that are different in speaker characteristics. According to the embodiment of the present disclosure, even when the channels are different in speaker characteristics, it is possible to perform correction processing corresponding to each channel on an audio signal. Further, in the case where the speaker characteristics of the left channel and the right channel of the speaker are identical, one filter coefficient can be used in the correction processing for the respective speakers and the capacity of the retention unit can be saved.

The retention unit may further retain channel number information that corresponds to each of the plurality of speakers and indicates a channel number, and the coefficient setting unit may refer to the channel number information to set the filter coefficient in the digital filter.

According to the embodiment of the present disclosure, in accordance with a channel number of a speaker, the correction processing for correcting the speaker characteristics is performed on an audio signal. In the case where a speaker is monaural, it is possible to adjust a channel number for digital filter processing and reduce a computation amount. Further, it is possible to reduce the filter coefficient to half in the case where the speaker is monaural, as compared to the case where the speaker is stereo, and save the capacity of the retention unit.

The retention unit may further retain speaker identification information that corresponds to each of the plurality of speakers and is associated to each model of the plurality of speakers, and the coefficient setting unit may set, in the digital filter, the filter coefficient of the speaker to which the speaker identification information corresponding to other information is assigned, the other information being acquired from the speaker connected to the output unit and indicating a model of the speaker.

When the speaker is connected to the output unit, in order that the coefficient setting unit may select a filter coefficient corresponding to that speaker, it is necessary for the coefficient setting unit to recognize a model of the speaker. The speaker model may be recognized by, for example, an input made by a user to designate a speaker model. However, as in the embodiment of the present disclosure, the coefficient setting unit acquires information indicating a model from the speaker and compares the information with the speaker model information, with the result that the coefficient setting unit can recognize a speaker model when the user only connects the speaker.

The retention unit may further retain a coefficient word length of the coefficient setting unit, the coefficient word length corresponding to each of the plurality of speakers, and the coefficient setting unit may refer to the coefficient word length to set the filter coefficient in the digital filter.

According to the embodiment of the present disclosure, in accordance with the coefficient word length of the signal processing unit, it is possible to perform correction processing for correcting speaker characteristics on an audio signal and reduce a computation amount by the signal processing unit.

The audio signal processing apparatus may further include: a test signal output unit configured to output a test signal to the speaker connected to the output unit; an audio collection unit configured to collect audio output from the speaker by the test signal; and a coefficient generation unit configured to generate the filter coefficient corresponding to the speaker from the audio collected by the audio collection unit and retain the filter coefficient in the retention unit.

According to the embodiment of the present disclosure, even when a speaker whose corresponding filter coefficient is not retained in the retention unit is connected to the output unit, the audio signal processing apparatus can generate a filter coefficient corresponding to that speaker and use the filter coefficient in the correction processing. Accordingly, the audio signal processing apparatus according to the embodiment of the present disclosure can correct speaker characteristics for various speakers more than those retained in the retention unit in advance.

The audio signal processing apparatus may further include: a test signal output unit configured to output a test signal to the speaker connected to the output unit; an audio collection unit configured to collect audio output from the speaker by the test signal; and a coefficient generation unit configured to generate the filter coefficient corresponding to the speaker from the audio collected by the audio collection unit and associate the speaker with one filter coefficient having a highest similarity from the filter coefficients retained in the retention unit.

According to the embodiment of the present disclosure, even when a speaker whose corresponding filter coefficient is not retained in the retention unit is connected to the output unit, the audio signal processing apparatus can generate a filter coefficient corresponding to that speaker and use the filter coefficient for the correction processing. In this case, the coefficient generation unit compares a newly generated filter coefficient with the filter coefficients retained in the retention unit, and associates the speaker with the filter coefficient having the highest similarity. It should be noted that the similarity can be judged based on whether values of the filter coefficients are close to each other, for example. Accordingly, a new filter coefficient is not added to the retention unit even when a new speaker is connected, and it is possible to save the capacity of the retention unit.

According to another embodiment of the present disclosure, there is provided an audio signal processing method including measuring impulse responses of a plurality of speakers having different speaker characteristics.

Filter coefficients obtained from the impulse responses are retained in a retention unit while being associated with the plurality of speakers.

One of the filter coefficients that corresponds to a connected speaker is selected from the retention unit to be set in the digital filter, and is applied to an audio signal.

As described above, according to the embodiments of the present disclosure, it is possible to provide an audio signal processing apparatus and an audio signal processing method that are capable of performing correction processing corresponding to speaker characteristics of a connected speaker on an audio signal.

These and other objects, features and advantages of the present disclosure will become more apparent in light of the following detailed description of best mode embodiments thereof, as illustrated in the accompanying drawings.

DETAILED DESCRIPTION OF EMBODIMENTS

First Embodiment

A first embodiment of the present disclosure will be described.

[Structure of Audio Signal Processing Apparatus]

Figure 1:
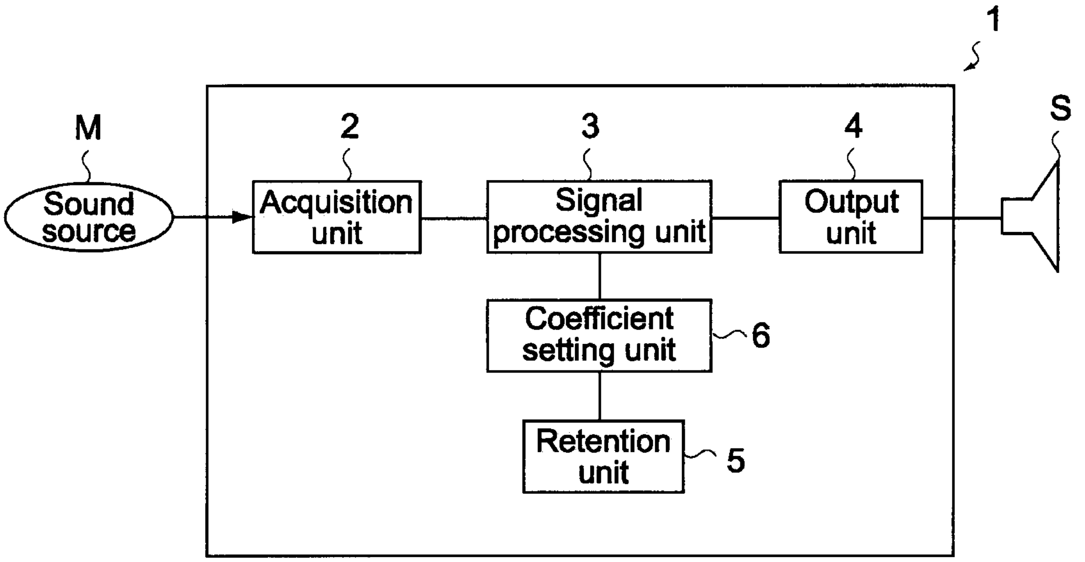
FIG. 1 is a block diagram showing an audio signal processing apparatus according to a first embodiment of the present disclosure.

FIG. 1 is a block diagram showing an audio signal processing apparatus 1 according to the first embodiment of the present disclosure. The audio signal processing apparatus 1 shown in FIG. 1 is a portable music reproduction device, for example.

As shown in FIG. 1, the audio signal processing apparatus 1 includes an acquisition unit 2, a signal processing unit 3, an output unit 4, a retention unit 5, and a coefficient setting unit 6. The acquisition unit 2 and the output unit 4 are connected to each other via the signal processing unit 3, and the retention unit 5 is connected to the signal processing unit 3 via the coefficient setting unit 6. Further, FIG. 1 shows a speaker S connected to the output unit 4, and a sound source M. In addition, a headphone may be connected instead of the speaker S.

The acquisition unit 2 acquires an audio signal from the sound source M. The sound source M may be a sound source recorded on a recording medium such as a CD (Compact Disc), or may be a sound source acquired from the Internet or the like. The acquisition unit 2 may be a CD drive, for example. The acquisition unit 2 supplies the acquired audio signal to the signal processing unit 3. The audio signal acquired by the acquisition unit 2 may be an analog signal or a digital signal. In the case of an analog signal, the analog signal is subjected to A/D (analog/digital) conversion in the acquisition unit 2.

The signal processing unit 3 performs correction processing on the audio signal supplied from the acquisition unit 2. The signal processing unit 3 may be a digital filter. The signal processing unit 3 performs the correction processing described above with use of a filter coefficient group included in a coefficient file of the speaker S that is set by the coefficient setting unit 6, the details of which will be described later. The signal processing unit 3 supplies the audio signal that has been subjected to the correction processing to the output unit 4.

The output unit 4 outputs the audio signal supplied from the signal processing unit 3 to the speaker S. The output unit 4 includes a D/A (digital/analog) converter or an amplifier, for example. Further, the output unit 4 is provided with a connector capable of connecting the speaker S thereto. For example, the shape of this connector can limit models of speakers connectable to the output unit 4.

The retention unit 5 retains “coefficient files” of various types of speakers. The retention unit 5 is a ROM (Read Only Memory), a RAM (Random Access Memory), or the like.

The coefficient setting unit 6 selects a coefficient file of the speaker S connected to the output unit 4 from the coefficient files of various types of speaker candidates retained in the retention unit 5, and sets a filter coefficient group included in the coefficient file in the signal processing unit 3. In this embodiment, the coefficient setting unit 6 selects a corresponding coefficient file based on information of the speaker S input by a user using an input means (not shown).

The audio signal processing apparatus 1 is structured as described above. It should be noted that audio signal processing apparatuses according to embodiments of the present disclosure are not limited to ones shown in the specification, and include an equivalent to the audio signal processing apparatus 1. For example, some structures described above may be arranged in a plurality of apparatuses connected to one another.

[Digital Filter]

A digital filter of the signal processing unit 3 will now be described.

Figure 2:
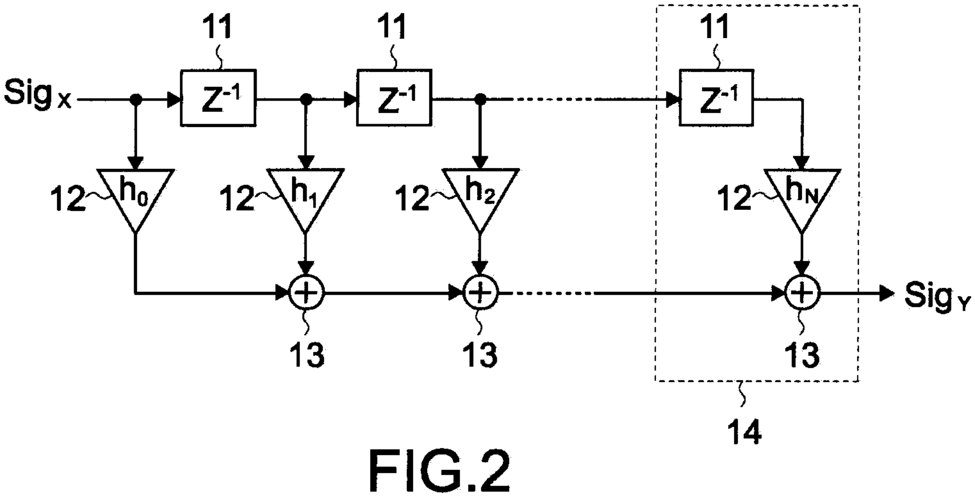
FIG. 2 is a conceptual diagram showing an example of a digital filter of a signal processing unit.

FIG. 2 is a conceptual diagram showing an example of a digital filter of the signal processing unit 3. FIG. 2 shows an FIR (Finite Impulse Response) filter, but different digital filters such as an IIR (Infinite impulse response) filter may be used.

As shown in FIG. 2, a digital filter F includes a plurality of (N pieces of) delay blocks 11, multipliers 12, and adders 13. An input signal $Sig_X$ input to the digital filter F is subjected to Z-transform (Laplace transform with respect to discrete signal) in the delay blocks 11 and delayed by one clock. The delayed signals are multiplied by a predetermined filter coefficient group h (sets of filter coefficients $h_0$ to $h_N$) in the multipliers 12. The filter coefficient group h is determined in a measurement operation to be described later. The signals that have passed through the multipliers 12 are added up by the adders 13 and output as an output signal $Sig_Y$.

The set of one delay block 11, a multiplier 12 to which an output of the delay block 11 is input, and an adder 13 to which an output of the multiplier 12 is input is a tap 14. In other words, the digital filter F includes N pieces of taps 14. As the number of taps 14 (hereinafter, referred to as tap number) is larger, a frequency characteristic can be changed more rapidly, but the computation amount of the digital filter F is increased. By the number of taps 14 (hereinafter, referred to as tap number) and the filter coefficient group h, a filter characteristic of the digital filter F is determined. As described above, the signal processing unit 3 applies the digital filter F in which an audio signal is used as an input signal $Sig_x$, and outputs a corrected audio signal as an output signal $Sig_Y$.

[Correction Processing]

The correction of an audio signal by the signal processing unit 3 will now be described.

As described above, the signal processing unit 3 uses the filter coefficient group included in the coefficient file of the speaker S to perform correction processing on an audio signal by the digital filter F. For that processing, a filter coefficient group h of the speaker S is determined in advance.

Figure 3A:
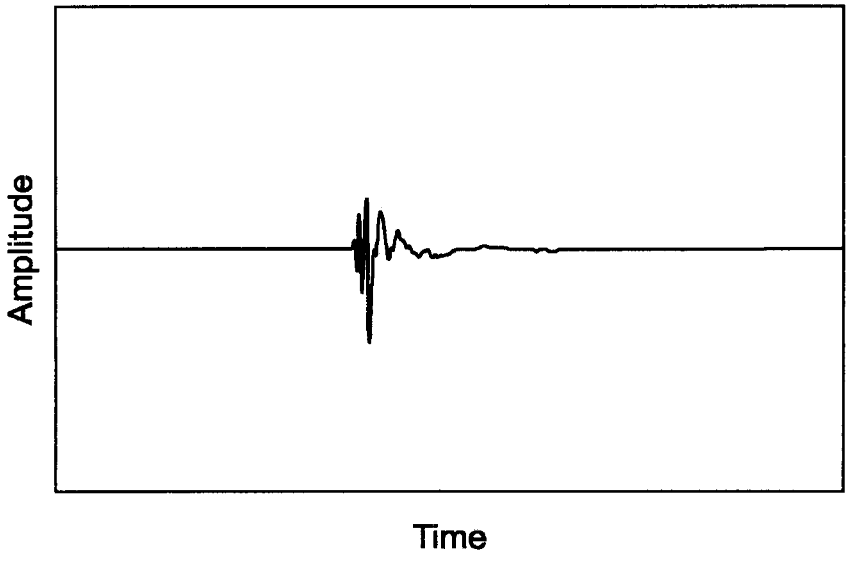
FIG. 3A and FIG. 3B are graphs showing an impulse response of a specific speaker and a frequency characteristic thereof.

The filter coefficient group h is determined based on measured results of an "impulse response" of the speaker S. The measurement of the impulse response is performed using the speaker S and a microphone opposed to the speaker S in a predetermined distance. An impulse signal (instantaneous audio signal) is supplied to the speaker S and audio is output from the speaker S. The audio is measured using the microphone to obtain an impulse response. FIG. 3A shows an example of a measured impulse response. In the graph shown in FIG. 3A, the horizontal axis indicates a time and the vertical axis indicates an amplitude. The impulse response shown in FIG. 3A is subjected to Fourier transform (conversion of time domain signal into frequency domain signal), thus obtaining a frequency characteristic shown in FIG. 3B. In the graph shown in FIG. 3B, the horizontal axis indicates a frequency and the vertical axis indicates an amplitude. The characteristics of a speaker as shown in FIG. 3A and FIG. 3B are speaker characteristics.

Figure 3B:
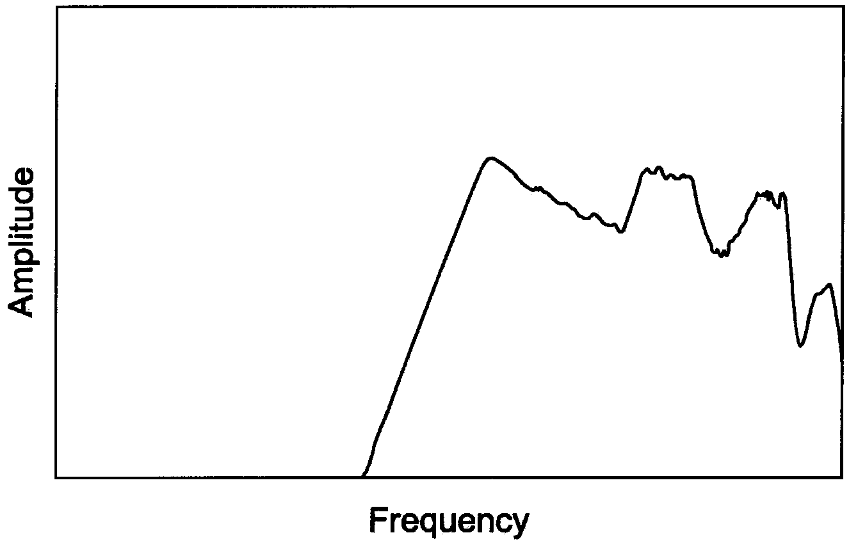

The speaker characteristics of the speaker S shown in FIG. 3A and FIG. 3B are corrected to be ideal speaker characteristics through correction processing performed by the signal processing unit 3. The ideal speaker characteristics refer to an impulse response to be collected by the microphone and a frequency characteristic thereof, assuming that an ideal speaker and microphone are opposed to each other in a distance identical to that when the impulse response of the speaker S is measured. Here, as the ideal speaker characteristics, speaker characteristics in which a peak of the impulse is sharp and a frequency characteristic is flat are exemplified, but speaker characteristics are not limited thereto and any speaker characteristics can be set.

Figure 4A:
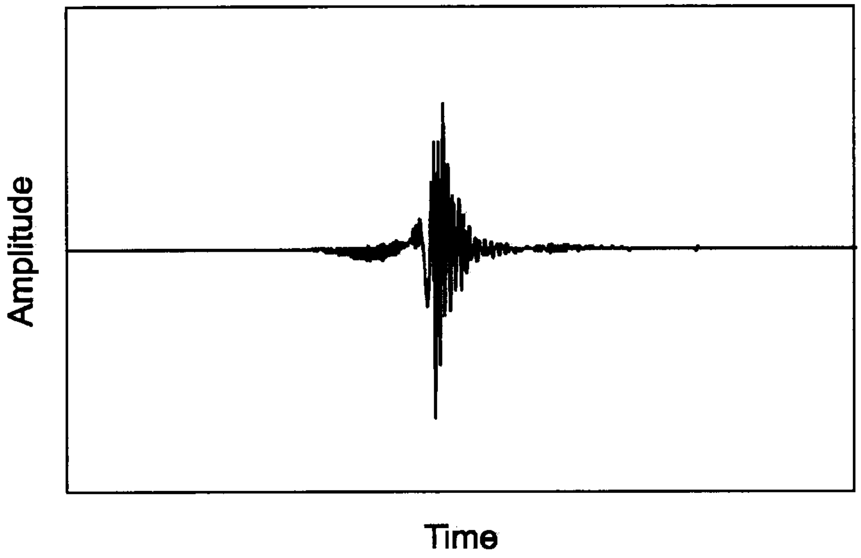
FIG. 4A and FIG. 4B are graphs showing an impulse response having a reverse characteristic of the speaker and a frequency characteristic thereof.
Figure 4B:
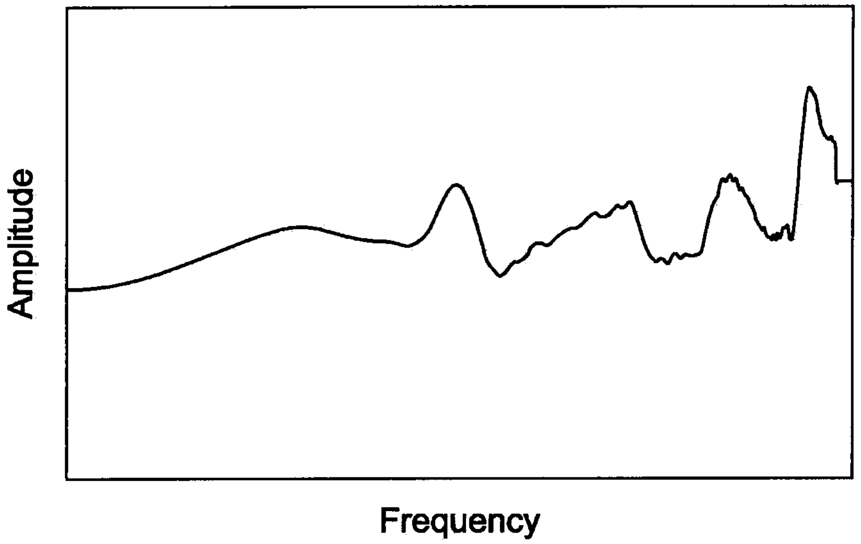

To correct the speaker characteristics of the speaker S to be ideal speaker characteristics, the filter coefficients $h_0$ to $h_N$ of the filter coefficient group h only have to be obtained and applied to an audio signal by the digital filter F. To that end, a "reverse characteristic" is calculated by division using speaker characteristics of the speaker S measured as "1". FIG. 4A shows an impulse response having a reverse characteristic and FIG. 4B shows a frequency characteristic having a reverse characteristic. The impulse response having a reverse characteristic can be set as filter coefficients $h_0$ to $h_N$ of the digital filter. The number of filter coefficients $h_0$ to $h_N$ (tap number) is a peak number of the impulse response.

Figure 5A:
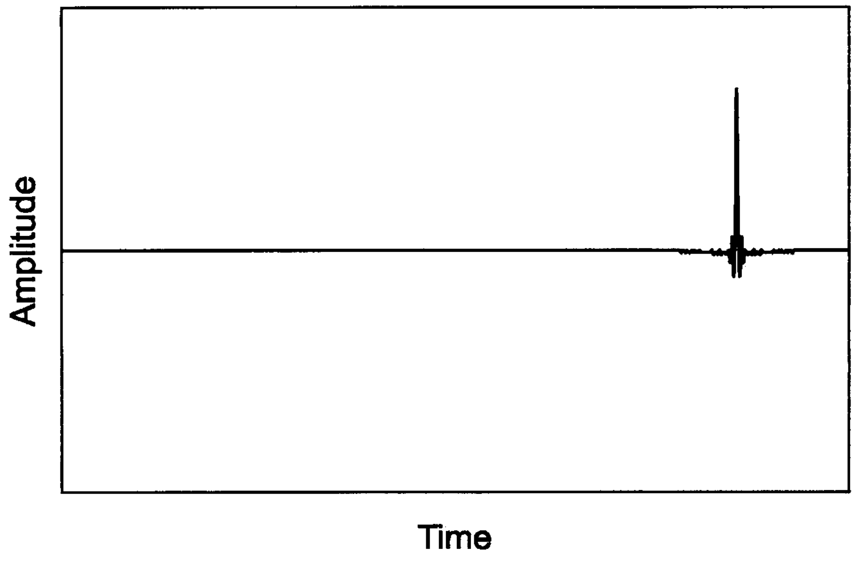
FIG. 5A and FIG. 5B are graphs showing an impulse response of the speaker that is obtained after correction processing is performed on an audio signal, and a frequency characteristic thereof.
Figure 5B:
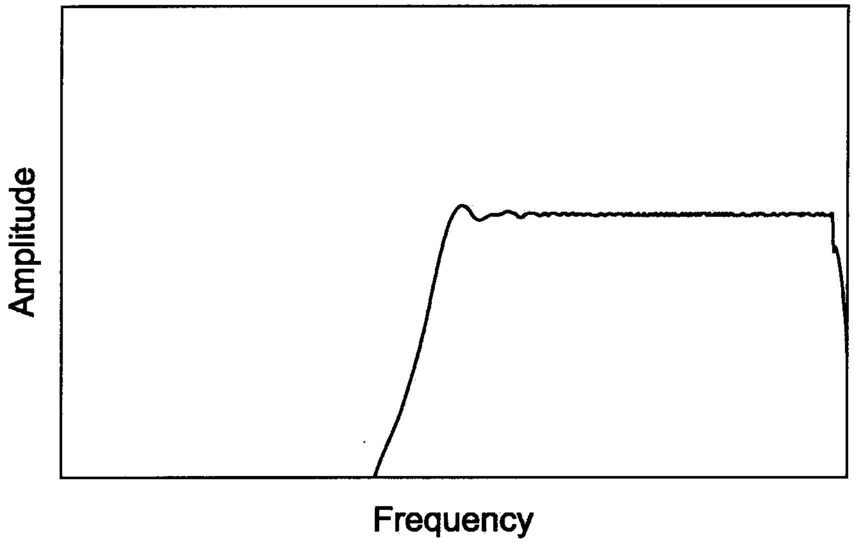

The signal processing unit 3 performs correction processing on an audio signal by the digital filter F in which the filter coefficient group h is set as described above. Accordingly, a reverse characteristic is imparted to the audio signal and superimposed on the speaker characteristics when audio is output by the speaker S. In other words, the speaker characteristics of the speaker S are corrected. FIG. 5A shows an impulse response of the speaker S when an audio signal is subjected to correction processing, and FIG. 5B shows a frequency characteristic thereof. As shown in FIGS. 5A and 5B, the peak of the impulse response is made sharp and the frequency characteristic is made flat.

[Coefficient File]

As described above, the speaker characteristics of the speaker S can be corrected using the filter coefficient group h obtained from the reverse characteristic of the speaker S. Therefore, by storing the filter coefficient group h of the speaker S in a "coefficient file" associated with the speaker S to retain the filter coefficient group h in the retention unit 5, the audio signal processing apparatus 1 can correct the speaker characteristics of the speaker S when the speaker S is connected to the output unit 4.

Figure 6:
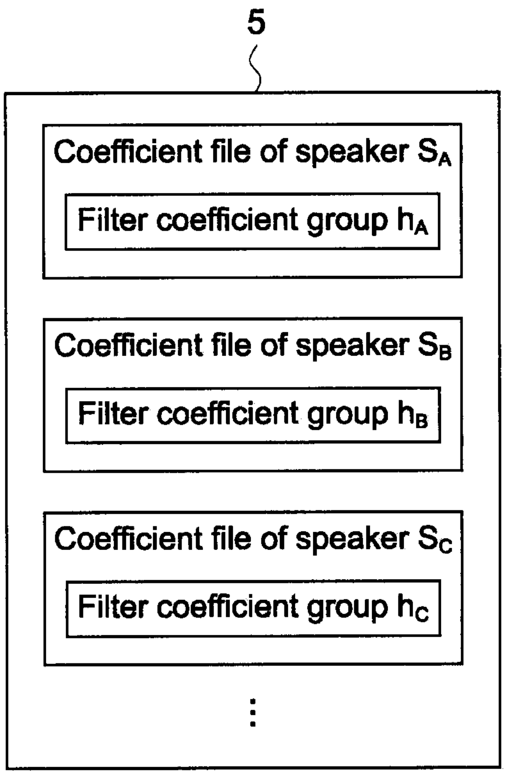
FIG. 6 is a conceptual diagram showing coefficient files of various speakers that are retained in a retention unit of the audio signal processing apparatus according to the first embodiment.

Further, the audio signal processing apparatus 1 can retain coefficient files including filter coefficient groups h of other models of speakers that may be connected to the output unit 4 in the retention unit 5, similarly to the speaker S. FIG. 6 is a conceptual diagram showing coefficient files of various speakers that are retained in the retention unit 5. In FIG. 6, speakers S different in model are represented as a speaker $S_A$, a speaker $S_B$, and a speaker $S_C$, and a filter coefficient group h of the speaker $S_A$, that of the speaker $S_B$, and that of the speaker $S_C$ are represented as a filter coefficient group $h_A$, a filter coefficient group $h_B$, and a filter coefficient group $h_C$.

[Selection of Coefficient File]

Figure 7:
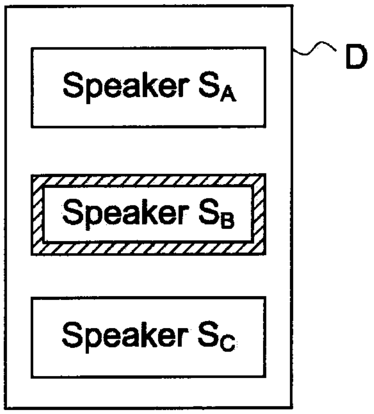
FIG. 7 is an example of a menu screen displayed on a display by a coefficient setting unit.

As described above, the coefficient setting unit 6 selects a coefficient file of a speaker that corresponds to the model of the speaker connected to the output unit 4, from the coefficient files of various speakers that are retained in the retention unit 5, and sets a filter coefficient group h included in the selected coefficient file in the signal processing unit 3. Specifically, the coefficient setting unit 6 can display a selection menu on a display provided to the audio signal processing apparatus 1 and causes a user to make selection. FIG. 7 shows an example of a menu screen to be displayed on a display D by the coefficient setting unit 6. When a user inputs a model of the connected speaker, the coefficient setting unit 6 selects a coefficient file of a corresponding speaker model.

[Operation of Audio Signal Processing Apparatus]

Operations of the audio signal processing apparatus 1 will now be described.

Figure 8:
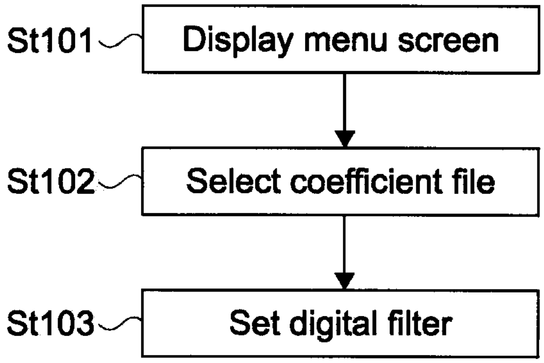
FIG. 8 is a flowchart showing operations of the audio signal processing apparatus according to the first embodiment.

FIG. 8 is a flowchart showing operations of the audio signal processing apparatus 1.

As shown in FIG. 8, when the speaker S is connected to the output unit 4, the coefficient setting unit 6 displays the menu screen described above on the display (St101). Upon reception of an operation input made by the user, the coefficient setting unit 6 selects a coefficient file of a corresponding speaker (St102). Next, the coefficient setting unit 6 sets a filter coefficient group h included in that coefficient file in the digital filter F of the signal processing unit 3 (St103). In this manner, the audio signal processing apparatus 1 sets a filter coefficient in the digital filter of the signal processing unit 3 in accordance with the model of the connected speaker.

When an instruction to reproduce audio is issued, the acquisition unit 2 acquires an audio signal from the sound source M and supplies the audio signal to the signal processing unit 3. The signal processing unit 3 performs correction processing on the supplied audio signal by using the digital filter F to supply the resultant audio signal to the output unit 4. The output unit 4 performs processing such as D/A conversion or amplification on the supplied audio signal, and supplies the resultant audio signal to the speaker S to output audio. When the speaker S connected to the output unit 4 is changed by the user, the audio signal processing apparatus 1 sets again a filter coefficient group h included in a coefficient file corresponding to the model of a speaker in the digital filter F.

As described above, in this embodiment, since the audio signal processing apparatus 1 retains coefficient files of various types of speakers that may be connected thereto, it is possible to set a digital filter in accordance with a model of a connected speaker. Accordingly, the audio signal processing apparatus 1 can perform correction processing on an audio signal in accordance with the model of a speaker to be connected, and correct speaker characteristics.

Second Embodiment

A second embodiment of the present disclosure will now be described.

In the second embodiment, the same structures as those in the first embodiment are denoted by the same reference symbols and description thereof will be omitted.

An audio signal processing apparatus according to this embodiment is identical to that of the first embodiment in that the coefficient setting unit 6 selects a filter coefficient group h corresponding to a model of a speaker to be connected to the output unit 4 from the retention unit 5, and uses the filter coefficient group h for correction processing in the signal processing unit 3. However, this embodiment is different from the first embodiment in the details of the coefficient files retained in the retention unit 5.

[Coefficient File]

Figure 9:
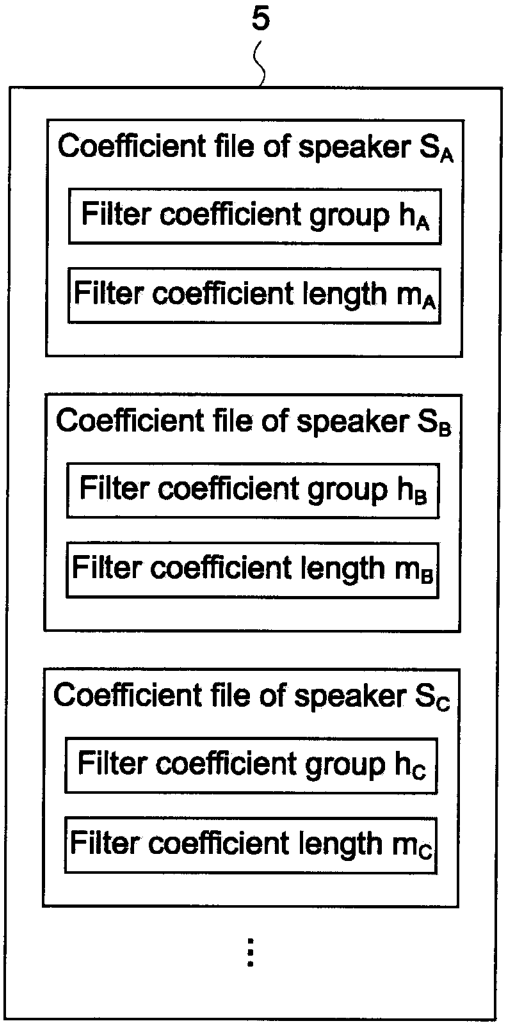
FIG. 9 is a conceptual diagram showing coefficient files of various speakers that are retained in a retention unit of an audio signal processing apparatus according to a second embodiment of the present disclosure.

FIG. 9 is a conceptual diagram showing coefficient files of various speakers that are retained in the retention unit 5. As shown in FIG. 9, a coefficient file corresponding to each speaker includes a "filter coefficient length" m, in addition to the filter coefficient group h. The filter coefficient length m is a length of a filter coefficient group h (number of filter coefficients $h_0$ to $h_N$) and is set for each model of the speaker S. In FIG. 9, a filter coefficient length m of the speaker $S_A$ is represented as a filter coefficient length $m_A$, a filter coefficient length m of the speaker $S_B$ is represented as a filter coefficient length $m_B$, and a filter coefficient length m of the speaker $S_c$ is represented as a filter coefficient length $m_c$.

The filter coefficient length m has an influence on a correction range of the speaker characteristics. As described above, an audio signal is subjected to correction processing by the signal processing unit 3 and the speaker characteristics of the speaker S are corrected. However, a speaker has a lowest resonance frequency f0 derived from a diaphragm thereof, and it is difficult for the speaker to properly output audio having a frequency lower than the lowest resonance frequency f0.

Figure 10A:
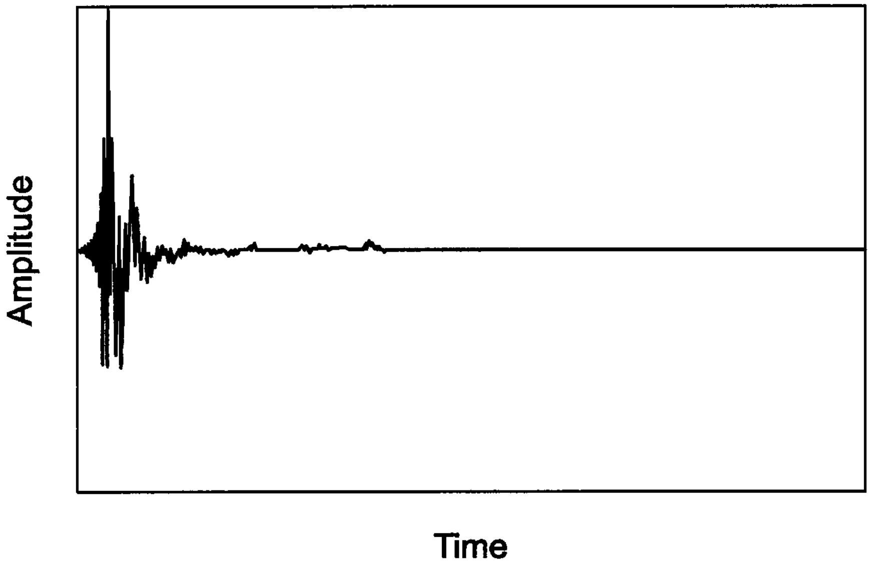
FIG. 10A and FIG. 10B are graphs showing for comparison an impulse response of a speaker and a frequency characteristic thereof.
Figure 10B:
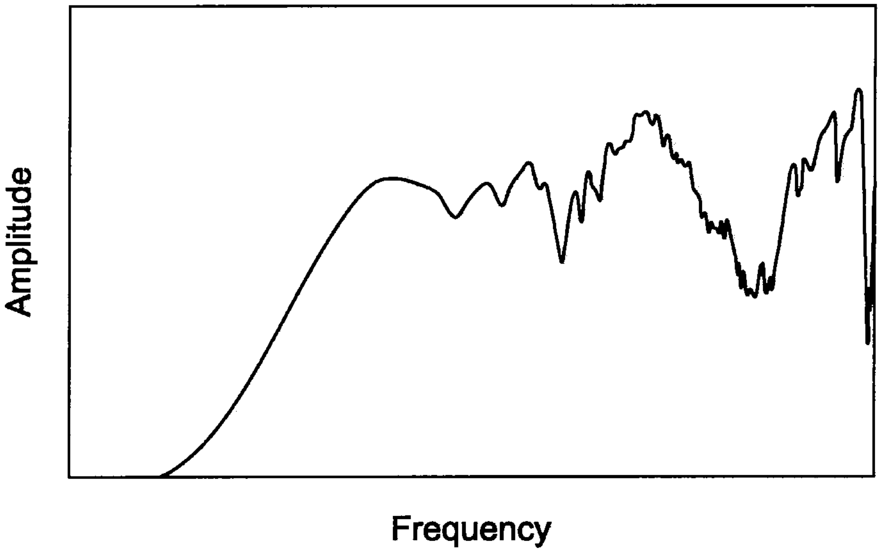
Figure 11A:
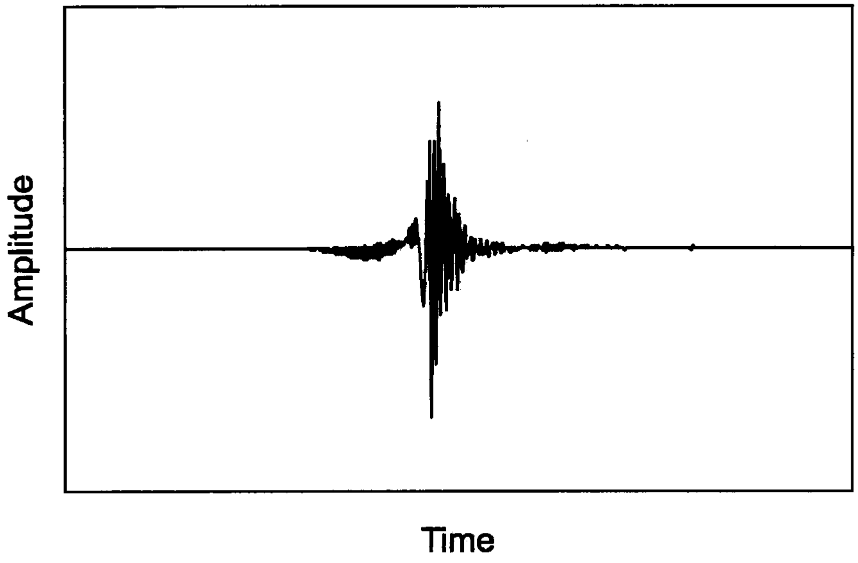
FIG. 11A and FIG. 11B are graphs showing an impulse response having a reverse characteristic of the speaker and a frequency characteristic thereof.
Figure 11B:
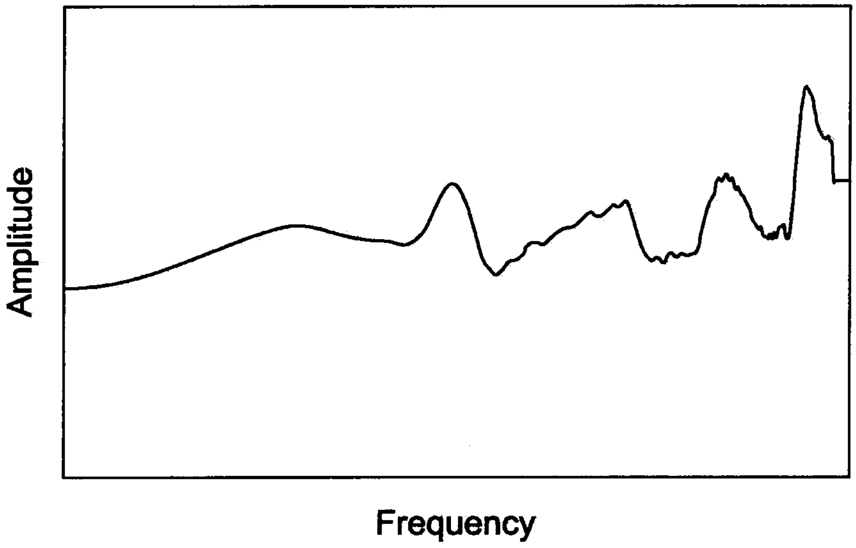
Figure 12A:
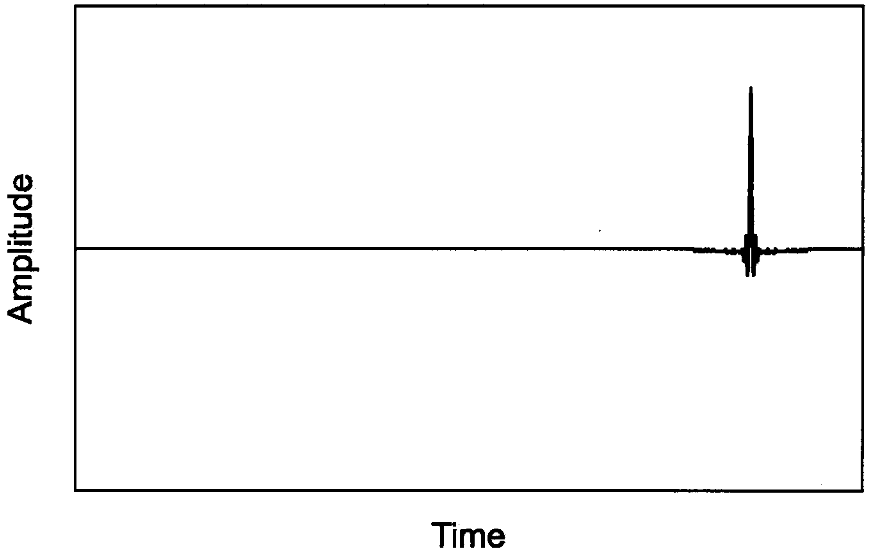
FIG. 12A and FIG. 12B are graphs showing an impulse response of the speaker that is obtained after correction processing is performed on an audio signal, and a frequency characteristic thereof.
Figure 12B:
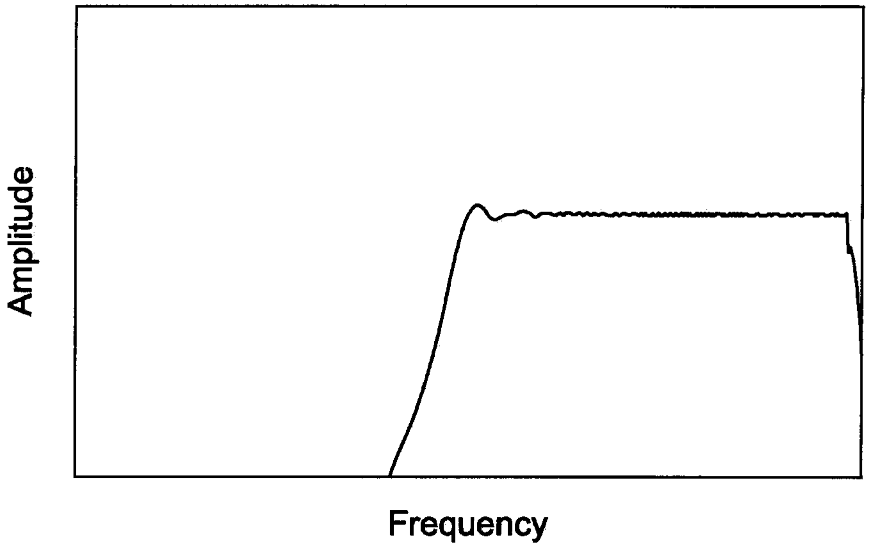

FIG. 10A is a graph showing for comparison an impulse response of a speaker T, and FIG. 10B is a graph showing a frequency characteristic thereof. FIG. 11A is a graph showing an impulse response having a reverse characteristic of the speaker T, and FIG. 11B is a graph showing a frequency characteristic thereof. FIG. 12A is a graph showing an impulse response of the speaker T in the case where correction processing is performed on an audio signal, and FIG. 12B is a graph showing a frequency characteristic thereof. The speaker T and the speaker S undergo the same processes, in other words, impulse responses of the speaker T and the speaker S are measured and filter coefficient groups thereof are calculated, and then the speaker characteristics are corrected by the digital filter.

Comparing FIG. 3B and FIG. 10B, in the state before the correction of speaker characteristics, a frequency band in which audio can be output is wider to reach the low frequency side in the speaker T than in the speaker S, which reveals that a frequency f0 of the speaker T is smaller than a frequency f0 of the speaker S. As shown in FIG. 4B and FIG. 11B, a frequency band of the reverse characteristic is not largely different in the low frequency band. However, as shown in FIG. 5B and FIG. 12B, in the state after the correction of speaker characteristics, the speaker characteristics are made flat in both the figures, but the speaker T has a wider frequency band to reach the low frequency side.

As show in those figures, since a speaker has a lowest resonance frequency f0 depending on the structure thereof, a frequency band lower than a frequency f0 is difficult to be compensated by the correction processing of an audio signal. In addition, when an audio signal of a frequency band lower than the frequency f0 is supplied to the speaker, there is a fear that the audio signal is not output as audio and a nonlinear distortion such as a harmonic distortion occurs. Therefore, it is suitable to correct an audio signal only in a frequency band equal to or larger than the frequency f0 in accordance with the model of the speaker.

Here, in the digital filter, in accordance with a frequency band of an audio signal subjected to the correction processing, a necessary filter coefficient length m, that is, the number of filter coefficients $h_0$ to $h_N$ included in the filter coefficient group h differs. A filter coefficient length necessary for correcting an audio signal in the low frequency band is larger than a filter coefficient length m necessary for correcting an audio signal in the high frequency band. Therefore, a frequency band of an audio signal to be subjected to correction processing can be limited by varying a filter coefficient length m in accordance with the model of a speaker (lowest resonance frequency f0). In the above example, by making a filter coefficient length m of a speaker S having a large frequency f0 smaller than a filter coefficient length m of a speaker S having a small frequency f0, it is possible to perform correction processing on an audio signal for a frequency band corresponding to each speaker.

Therefore, by imparting a filter coefficient length m corresponding to the model of a speaker to a coefficient file of that speaker retained in the retention unit 5, it is possible for the coefficient setting unit 6 to select an appropriate filter coefficient from the filter coefficients $h_0$ to $h_N$ to set it in the digital filter F of the signal processing unit 3.

[Operation of Audio Signal Processing Apparatus]

Operations of the audio signal processing apparatus according to this embodiment will now be described.

Figure 13:
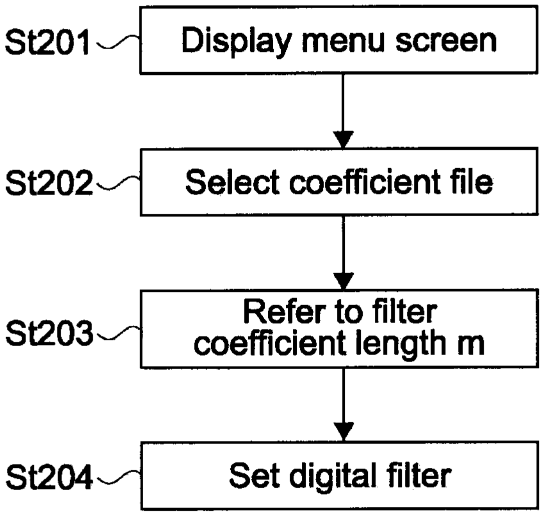
FIG. 13 is a flowchart showing operations of the audio signal processing apparatus according to the second embodiment.

FIG. 13 is a flowchart showing operations of the audio signal processing apparatus.

As shown in FIG. 13, when the speaker S is connected to the output unit 4, the coefficient setting unit 6 displays the menu screen described above on the display (St201). Upon reception of an operation input made by the user, the coefficient setting unit 6 selects a coefficient file of a corresponding speaker (St202). Next, the coefficient setting unit 6 refers to a filter coefficient length m included in the selected coefficient file of the speaker (St203). Subsequently, the coefficient setting unit 6 sets, based on the filter coefficient length m, appropriate filter coefficients $h_0$ to $h_N$ in the filter coefficient group h in the digital filter F (St204). When an instruction to reproduce audio is issued, the audio signal processing apparatus performs correction processing on an audio signal in the signal processing unit 3 to output audio from the speaker S as in the case of the first embodiment.

As described above, in this embodiment, since the coefficient file includes the filter coefficient length m corresponding to the model of the speaker S, only an audio signal of an appropriate frequency band is subjected to correction processing in the signal processing unit 3. Accordingly, it is possible to prevent audio having a frequency equal to or lower than the lowest resonance frequency f0 from being output from the speaker S. Further, appropriate filter coefficients are selected from the filter coefficients $h_0$ to $h_N$ based on the filter coefficient length m, and a tap number of the digital filter F is reduced. Therefore, it is also possible to reduce a computation amount of the signal processing unit 3.

Third Embodiment

A third embodiment of the present disclosure will now be described.

In the third embodiment, the same structures as those in the first embodiment are denoted by the same reference symbols and description thereof will be omitted.

An audio signal processing apparatus according to this embodiment is identical to that of the first embodiment in that the coefficient setting unit 6 selects a filter coefficient group h corresponding to a model of a speaker to be connected to the output unit 4 from the retention unit 5, and uses the filter coefficient group h for correction processing in the signal processing unit 3. However, this embodiment is different from the first embodiment in the details of the coefficient files retained in the retention unit 5.

[Coefficient File]

Figure 14:
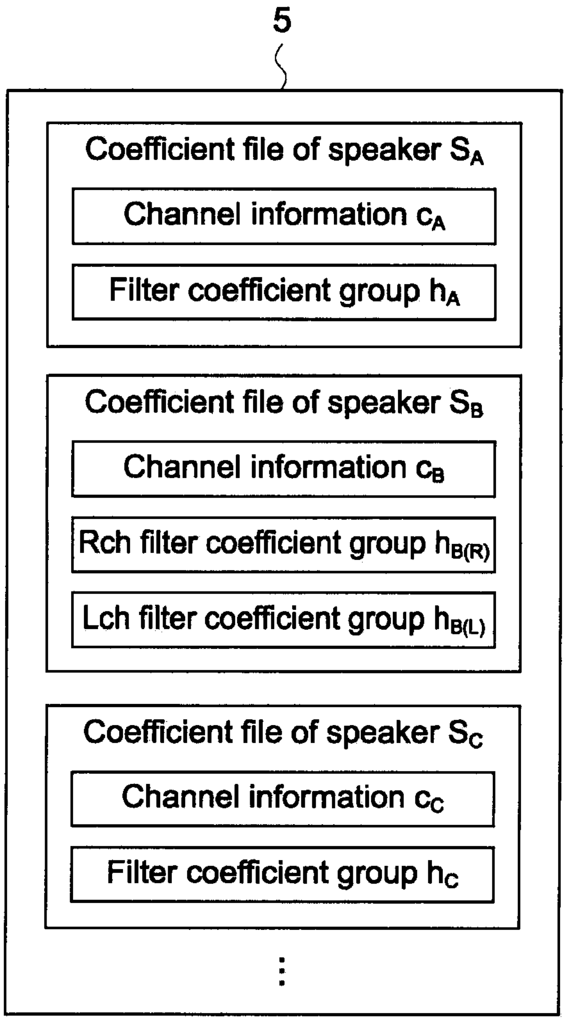
FIG. 14 is a conceptual diagram showing coefficient files of various speakers that are retained in a retention unit of an audio signal processing apparatus according to a third embodiment of the present disclosure.

FIG. 14 is a conceptual diagram showing coefficient files of various speakers that are retained in the retention unit 5. As shown in FIG. 14, a coefficient file corresponding to each speaker includes a filter coefficient group h and "channel information" c. Here, in the case where a right channel (Rch) and a left channel (Lch) of the speaker are different in speaker characteristics, the coefficient file includes filter coefficient groups h corresponding to the respective channels. Further, in the case where the left and right channels are identical in speaker characteristics, the coefficient file includes a filter coefficient group h shared by both the channels. Here, left and right channels of the speaker $S_B$ are different in speaker characteristics, and left and right channels of each of the speaker $S_A$ and the speaker $S_C$ are identical in speaker characteristics. The channel information c is information on whether filter coefficient groups used in left and right channels of a speaker are identical or different. In FIG. 14, channel information of the speaker $S_A$ is represented as channel information $c_A$, a filter coefficient group shared by left and right channels of the speaker $S_A$ is represented as a filter coefficient group $h_A$, and the same holds true for the speaker $S_C$. Further, channel information of the speaker $S_B$ is represented as channel information $c_B$, an Rch filter coefficient group thereof is represented as an Rch filter coefficient group $h_{B(R)}$, and an Lch filter coefficient group thereof is represented as an Lch filter coefficient group $h_{B(L)}$.

[Operation of Audio Signal Processing Apparatus]

Operations of the audio signal processing apparatus according to this embodiment will now be described.

Figure 15:
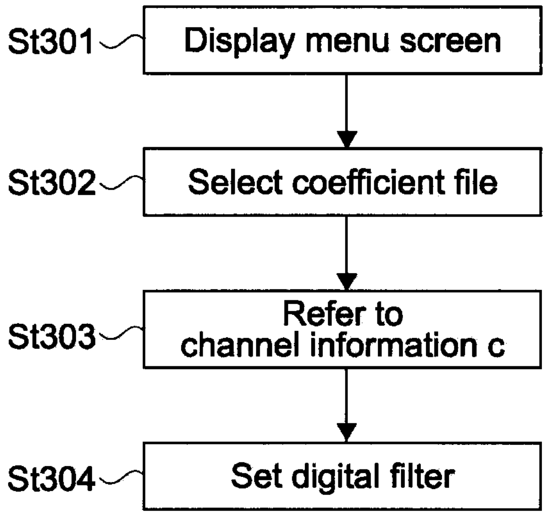
FIG. 15 is a flowchart showing operations of the audio signal processing apparatus according to the third embodiment.

FIG. 15 is a flowchart showing operations of the audio signal processing apparatus.

As shown in FIG. 15, when the speaker S is connected to the output unit 4, the coefficient setting unit 6 displays the menu screen described above on the display (St301). Upon reception of an operation input made by the user, the coefficient setting unit 6 selects a coefficient file of a corresponding speaker (St302). Subsequently, the coefficient setting unit 6 refers to channel information c included in the coefficient file (St303). In the case where a right channel and a left channel of that speaker have different filter coefficients, the coefficient setting unit 6 sets an Rch filter coefficient group $h_{(R)}$ and an Lch filter coefficient group $h_{(L)}$ in the signal processing unit 3 (St304). Alternatively, in the case where a right channel and a left channel of the speaker have the same filter coefficient, the coefficient setting unit 6 sets a filter coefficient group h shared by both the left and right channels in the signal processing unit 3 (St304). When an instruction to reproduce audio is issued, the audio signal processing apparatus performs correction processing on an audio signal in the signal processing unit 3 to output audio from the speaker S as in the case of the first embodiment.

As described above, in this embodiment, the coefficient file includes the channel information c serving as information on whether filter coefficient groups h used in left and right channels of a corresponding speaker are identical or different. The coefficient setting unit 6 refers to the channel information c and sets the filter coefficient group h in the digital filter. Thus, it is possible to reduce the filter coefficient group h to half in the case where the speaker characteristics of the right and left channels of the speaker are identical, as compared to the case where the speaker characteristics are different between the right and left channels, and save the capacity of the retention unit 5.

Fourth Embodiment

A fourth embodiment of the present disclosure will now be described.

In the fourth embodiment, the same structures as those in the first embodiment are denoted by the same reference symbols and description thereof will be omitted.

An audio signal processing apparatus according to this embodiment is identical to that of the first embodiment in that the coefficient setting unit 6 selects a filter coefficient group h corresponding to a model of a speaker to be connected to the output unit 4 from the retention unit 5, and uses the filter coefficient group h for correction processing in the signal processing unit 3. However, this embodiment is different from the first embodiment in the details of the coefficient files retained in the retention unit 5.

[Coefficient File]

Figure 16:
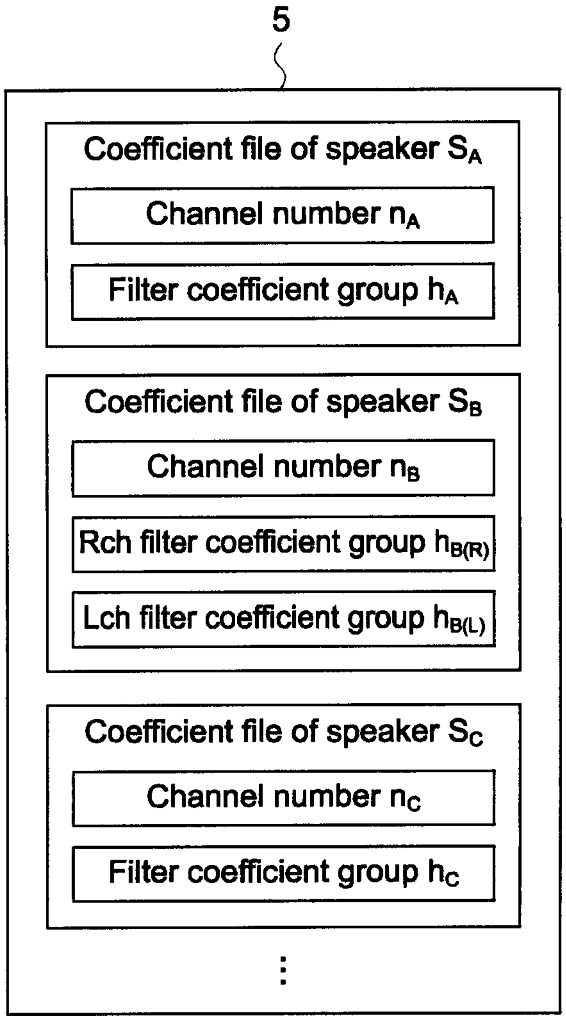
FIG. 16 is a conceptual diagram showing coefficient files of various speakers that are retained in a retention unit of an audio signal processing apparatus according to a fourth embodiment of the present disclosure.

FIG. 16 is a conceptual diagram showing coefficient files of various speakers that are retained in the retention unit 5. As shown in FIG. 16, a coefficient file corresponding to each speaker includes a filter coefficient group h and a "channel number" n. Here, in the case where the speaker is stereo (two channels), the coefficient file includes filter coefficient groups h corresponding to the respective channels. Further, in the case where the speaker is monaural (one channel), the coefficient file includes one filter coefficient group h. Here, the speaker $S_B$ is stereo and the speaker $S_A$ and the speaker $S_C$ are monaural. The channel number n is information on whether the speaker is stereo or monaural. In FIG. 16, a channel number of the speaker $S_A$ is represented as a channel number $n_A$, and a filter coefficient group thereof is represented as a filter coefficient group $h_A$. The same holds true for the speaker $S_C$. Further, a channel number of the speaker $S_B$ is represented as a channel number $n_B$, an Rch filter coefficient group thereof is represented as an Rch filter coefficient group $h_{B(R)}$, and an Lch filter coefficient group thereof is represented as an Lch filter coefficient group $h_{B(L)}$.

[Operation of Audio Signal Processing Apparatus]

Operations of the audio signal processing apparatus according to this embodiment will now be described.

Figure 17:
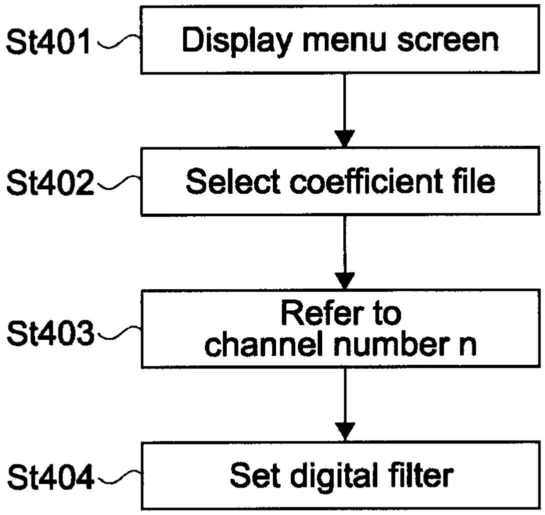
FIG. 17 is a flowchart showing operations of the audio signal processing apparatus according to the fourth embodiment.

FIG. 17 is a flowchart showing operations of the audio signal processing apparatus.

As shown in FIG. 17, when the speaker S is connected to the output unit 4, the coefficient setting unit 6 displays the menu screen described above on the display (St401). Upon reception of an operation input made by the user, the coefficient setting unit 6 selects a coefficient file of a corresponding speaker (St402). Subsequently, the coefficient setting unit 6 refers to a channel number n included in the coefficient file (St403). In the case where a channel number of the speaker is 2, that is, the speaker is stereo, the coefficient setting unit 6 sets an Rch filter coefficient group $h_{(R)}$ and an Lch filter coefficient group $h_{(L)}$ in the signal processing unit 3 (St404). Alternatively, in the case where a channel number of the speaker is 1, that is, the speaker is monaural, the coefficient setting unit 6 sets one of the Rch filter coefficient group $h_{(R)}$ and the Lch filter coefficient group $h_{(L)}$ in the signal processing unit 3 (St404). When an instruction to reproduce audio is issued, the audio signal processing apparatus performs correction processing on an audio signal in the signal processing unit 3 to output audio from the speaker S as in the case of the first embodiment.

As described above, in this embodiment, the coefficient file includes the channel number n serving as information of a channel number of a corresponding speaker. The coefficient setting unit 6 refers to the channel number n and sets the filter coefficient group h in the digital filter. In the case where the speaker is monaural, the channel number for digital filter processing can be adjusted to reduce a computation amount. Further, it is possible to reduce the filter coefficient group h to half in the case where the speaker is monaural, as compared to the case where the speaker is stereo, and save the capacity of the retention unit 5.

Fifth Embodiment

A fifth embodiment of the present disclosure will now be described.

In the fifth embodiment, the same structures as those in the first embodiment are denoted by the same reference symbols and description thereof will be omitted.

An audio signal processing apparatus according to this embodiment is identical to that of the first embodiment in that the coefficient setting unit 6 selects a filter coefficient group h corresponding to a model of a speaker to be connected to the output unit 4 from the retention unit 5, and uses the filter coefficient group h for correction processing in the signal processing unit 3. However, this embodiment is different from the first embodiment in the details of the coefficient files retained in the retention unit 5. In addition, in this embodiment, model information indicating information of a model, a model number, or the like is imparted to the speaker S.

[Coefficient File]

Figure 18:
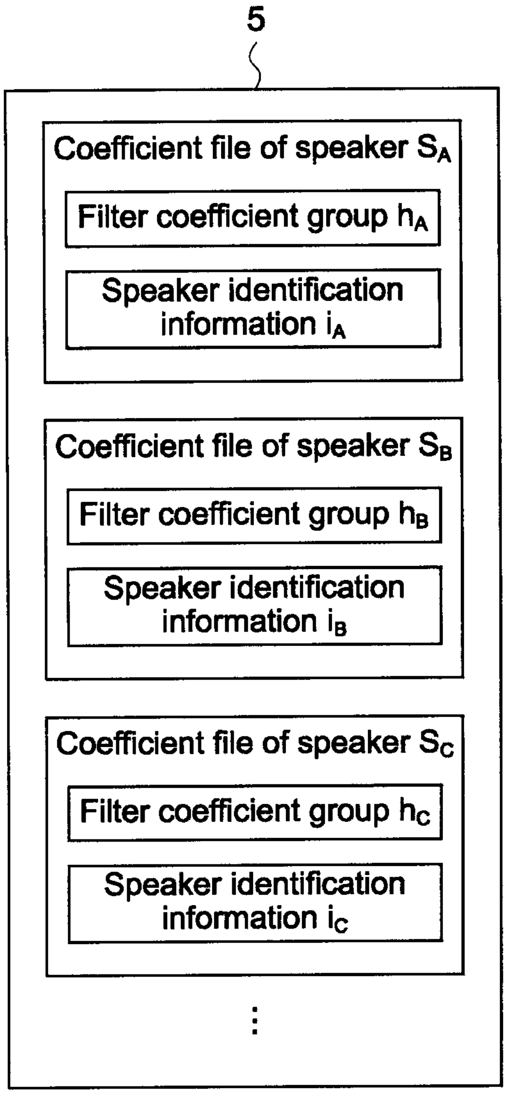
FIG. 18 is a conceptual diagram showing coefficient files of various speakers that are retained in a retention unit of an audio signal processing apparatus according to a fifth embodiment of the present disclosure.

FIG. 18 is a conceptual diagram showing coefficient files of various speakers that are retained in the retention unit 5. As shown in FIG. 18, a coefficient file corresponding to each speaker includes "speaker identification information" i. The speaker identification information i is information used for comparison with speaker model information acquired from the connected speaker S to search for a corresponding coefficient file. In FIG. 18, speaker identification information of the speaker $S_A$ is represented as speaker identification information $i_A$, speaker identification information of the speaker $S_B$ is represented as speaker identification information $i_B$, and speaker identification information of the speaker $S_C$ is represented as speaker identification information $i_C$.

[Operation of Audio Signal Processing Apparatus]

Operations of the audio signal processing apparatus according to this embodiment will now be described.

Figure 19:
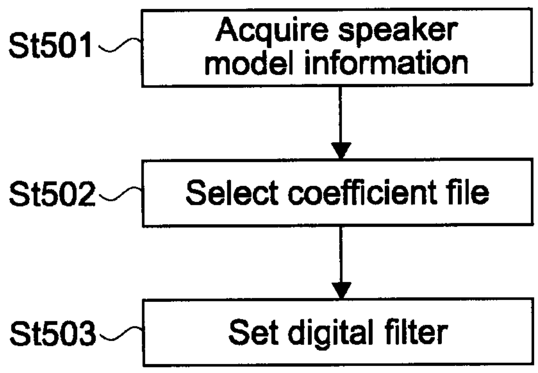
FIG. 19 is a flowchart showing operations of the audio signal processing apparatus according to the fifth embodiment.

FIG. 19 is a flowchart showing operations of the audio signal processing apparatus.

As shown in FIG. 19, when the speaker S is connected to the output unit 4, the coefficient setting unit 6 acquires model information of the speaker S (St501). Next, the coefficient setting unit 6 compares the model information of the speaker S with speaker identification information i included in each coefficient file, and specifies a coefficient file corresponding to the speaker S (St502). Subsequently, the coefficient setting unit 6 sets a filter coefficient group h included in the coefficient file in the digital filter F of the signal processing unit 3 (St503). When an instruction to reproduce audio is issued, the audio signal processing apparatus performs correction processing on an audio signal in the signal processing unit 3 to output audio from the speaker S as in the case of the first embodiment.

As described above, in this embodiment, the coefficient file includes the speaker identification information i used for searching for a coefficient file corresponding to the speaker S. Accordingly, the audio signal processing apparatus according to this embodiment can automatically set a filter coefficient group h corresponding to the speaker S without receiving an operation input made by a user when the speaker S is connected.

Sixth Embodiment

A sixth embodiment of the present disclosure will now be described.

In the sixth embodiment, the same structures as those in the first embodiment are denoted by the same reference symbols and description thereof will be omitted.

An audio signal processing apparatus according to this embodiment is identical to that of the first embodiment in that the coefficient setting unit 6 selects a filter coefficient group h corresponding to a model of a speaker to be connected to the output unit 4 from the retention unit 5, and uses the filter coefficient group h for correction processing in the signal processing unit 3. However, this embodiment is different from the first embodiment in the details of the coefficient files retained in the retention unit 5.

[Coefficient File]

Figure 20:
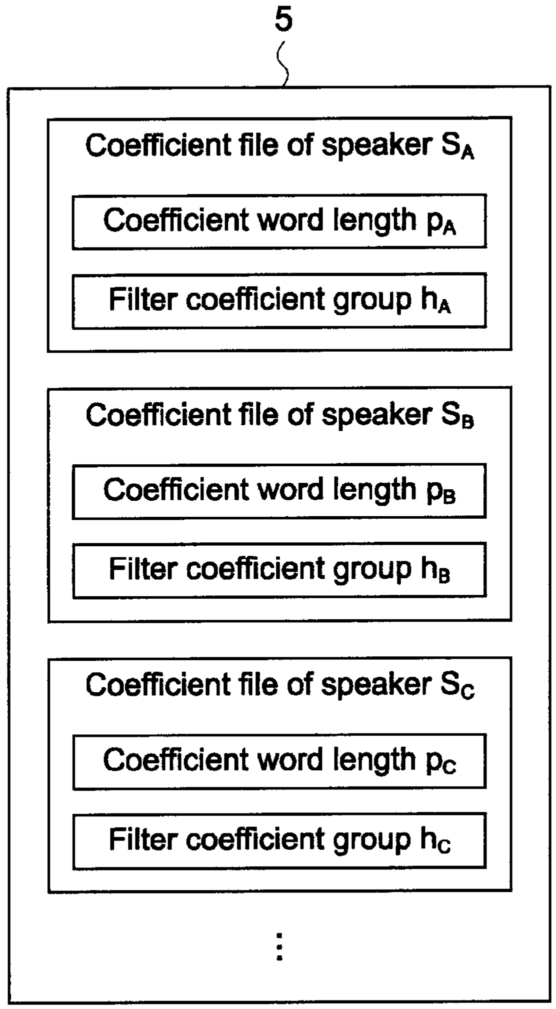
FIG. 20 is a conceptual diagram showing coefficient files of various speakers that are retained in a retention unit of an audio signal processing apparatus according to a sixth embodiment of the present disclosure.

FIG. 20 is a conceptual diagram showing coefficient files of various speakers that are retained in the retention unit 5. As shown in FIG. 20, a coefficient file corresponding to each speaker includes a "coefficient word length" p. The coefficient word length p is used for describing a word length of a coefficient used for signal processing in the signal processing unit 3, such as 16 bits or 32 bits. In FIG. 20, a coefficient word length of the speaker $S_A$ is represented as a coefficient word length $p_A$, a coefficient word length of the speaker $S_B$ is represented as a coefficient word length $p_B$, and a coefficient word length of the speaker $S_C$ is represented as a coefficient word length $p_C$.

[Operation of Audio Signal Processing Apparatus]

Operations of the audio signal processing apparatus according to this embodiment will now be described.

Figure 21:
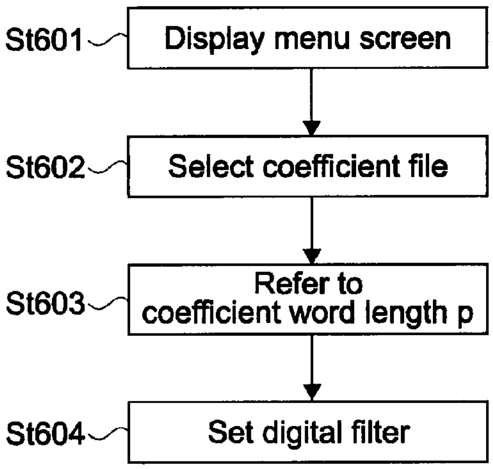
FIG. 21 is a flowchart showing operations of the audio signal processing apparatus according to the sixth embodiment.

FIG. 21 is a flowchart showing operations of the audio signal processing apparatus.

As shown in FIG. 21, when the speaker S is connected to the output unit 4, the coefficient setting unit 6 displays the menu screen described above on the display (St601). Upon reception of an operation input made by the user, the coefficient setting unit 6 selects a coefficient file of a corresponding speaker (St602). Subsequently, the coefficient setting unit 6 refers to a coefficient word length p included in the coefficient file (St603). Further, the coefficient setting unit 6 sets a filter coefficient group h included in the selected coefficient file in the signal processing unit 3 (St604). When an instruction to reproduce audio is issued, the audio signal processing apparatus performs correction processing on an audio signal in the signal processing unit 3 with use of the coefficient word length p to output audio from the speaker S.

As described above, in this embodiment, the coefficient file includes the coefficient word length p serving as a word length of a coefficient used for the signal processing in the signal processing unit 3. Accordingly, the computation amount in the signal processing unit 3 can be reduced.

Seventh Embodiment

A seventh embodiment of the present disclosure will now be described.

In the seventh embodiment, the same structures as those in the first embodiment are denoted by the same reference symbols and description thereof will be omitted.

An audio signal processing apparatus according to this embodiment is identical to that of the first embodiment in that the coefficient setting unit 6 selects a filter coefficient group h corresponding to a model of a speaker to be connected to the output unit 4 from the retention unit 5, and uses the filter coefficient group h for correction processing in the signal processing unit 3. However, the audio signal processing apparatus according to this embodiment is different from the audio signal processing apparatus 1 according to the first embodiment in that the audio signal processing apparatus itself can create a filter coefficient group of a connected speaker therein.

[Structure of Audio Signal Processing Apparatus]

Figure 22:
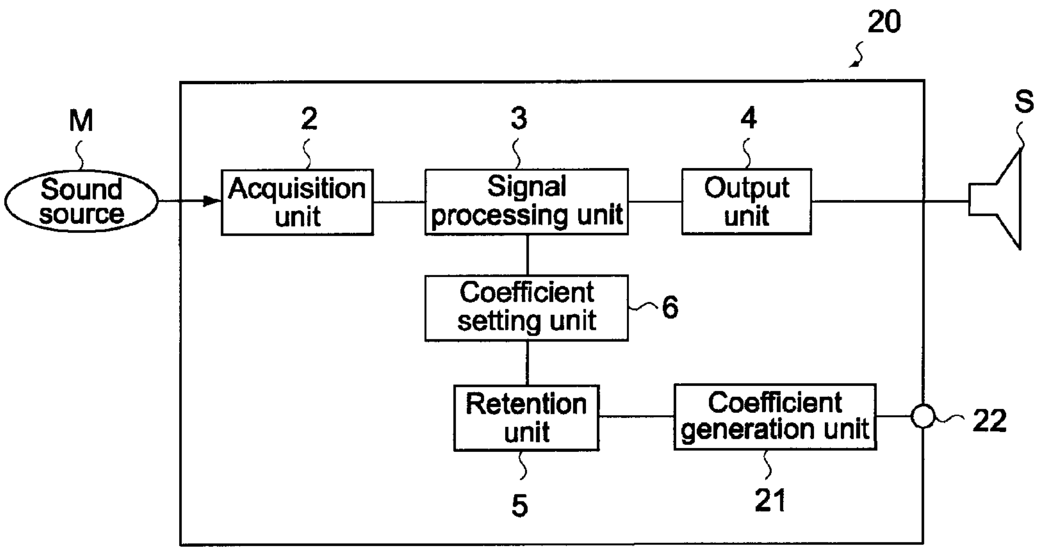
FIG. 22 is a block diagram showing an audio signal processing apparatus according to a seventh embodiment of the present disclosure.

FIG. 22 is a block diagram showing an audio signal processing apparatus 20 according to an embodiment of the present disclosure. As shown in FIG. 22, the audio signal processing apparatus 20 include a coefficient generation unit 21 and a microphone 22, in addition to the structure of the audio signal processing apparatus 1 according to the first embodiment. The microphone 22 is connected to the coefficient generation unit 21 and the coefficient generation unit 21 is connected to the retention unit 5.

The microphone 22 collects audio output from the speaker S to transmit the audio to the coefficient generation unit 21. The coefficient generation unit 21 calculates a filter coefficient group h of the speaker S from the audio collected by the microphone 22, and stores the filter coefficient group h in the coefficient file to retain it in the retention unit 5. The coefficient generation unit 21 includes an A/D converter that performs A/D conversion on an audio signal collected by the microphone 22.

Figure 23:
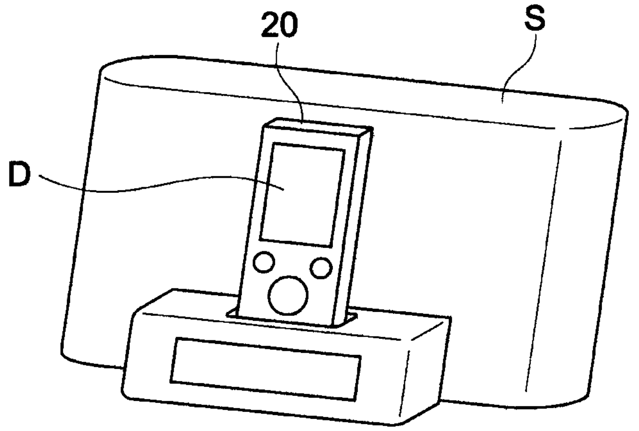
FIG. 23 is a perspective view showing an outer appearance of the audio signal processing apparatus according to the seventh embodiment.
Figure 24:
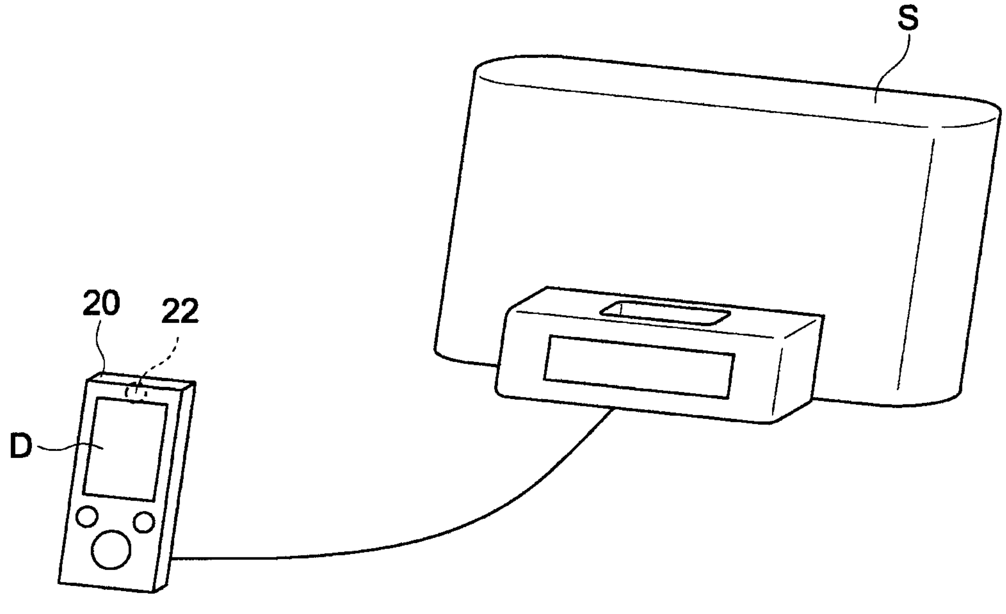
FIG. 24 is a perspective view of the audio signal processing apparatus according to the seventh embodiment, showing a state in which audio is collected by a microphone.
Figure 25:
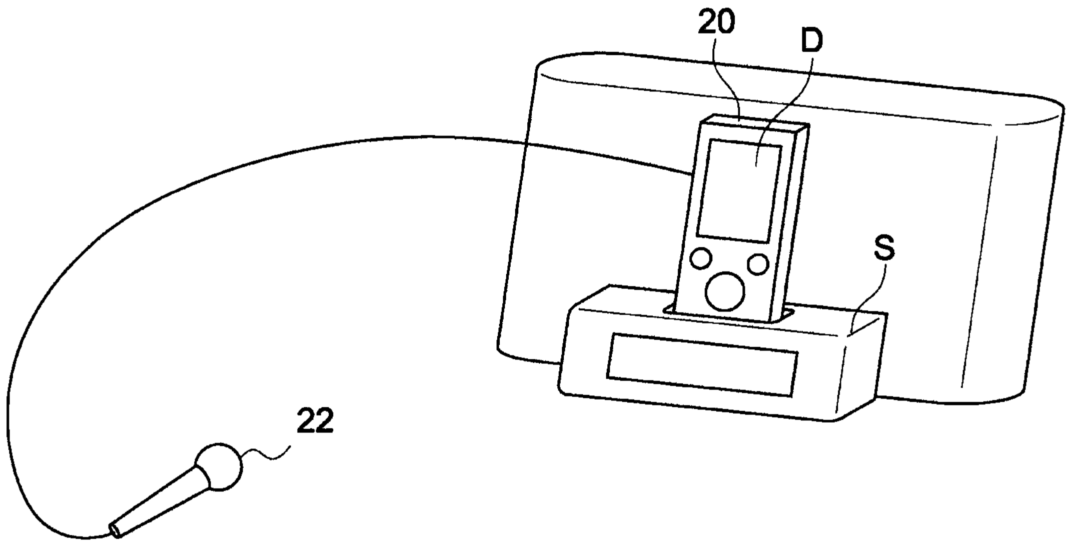
FIG. 25 is a perspective view of the audio signal processing apparatus according to the seventh embodiment, showing a state in which audio is collected by a microphone.

FIG. 23 is a perspective view showing an outer appearance of the audio signal processing apparatus 20. As shown in FIG. 23, the audio signal processing apparatus 20 is connected to the speaker S. FIG. 24 shows a state of the audio signal processing apparatus 20, in which audio output from the speaker S is collected by the microphone 22. Further, as shown in FIG. 25, the microphone 22 may be detachable from the audio signal processing apparatus 20.

[Addition of Coefficient File]

When a speaker S whose coefficient file is not retained in the retention unit 5 is connected to the audio signal processing apparatus 20, the audio signal processing apparatus 20 outputs a test signal from the output unit 4 to the speaker S. The test signal may be the impulse signal described above. The microphone 22 collects the audio output from the speaker S by the test signal, and transmits the audio to the coefficient generation unit 21.

The coefficient generation unit 21 calculates a filter coefficient group h from the audio (impulse response) collected by the microphone 22. The filter coefficient group h can be calculated by the above-mentioned method. The coefficient generation unit 21 supplies the calculated filter coefficient group h to the retention unit 5. In this case, the coefficient generation unit 21 stores the filter coefficient group h in a coefficient file associated with the model of the speaker S to retain the filter coefficient group h in the retention unit 5. The model of the speaker S may be input by the user or may be acquired using the speaker identification information i described in the fifth embodiment. In this manner, in the case where a speaker whose coefficient file is not retained in the retention unit 5 is connected to the audio signal processing apparatus 20, the audio signal processing apparatus 20 itself can add a coefficient file of that speaker.

[Operation of Audio Signal Processing Apparatus]

Operations of the audio signal processing apparatus according to this embodiment will now be described.

Figure 26:
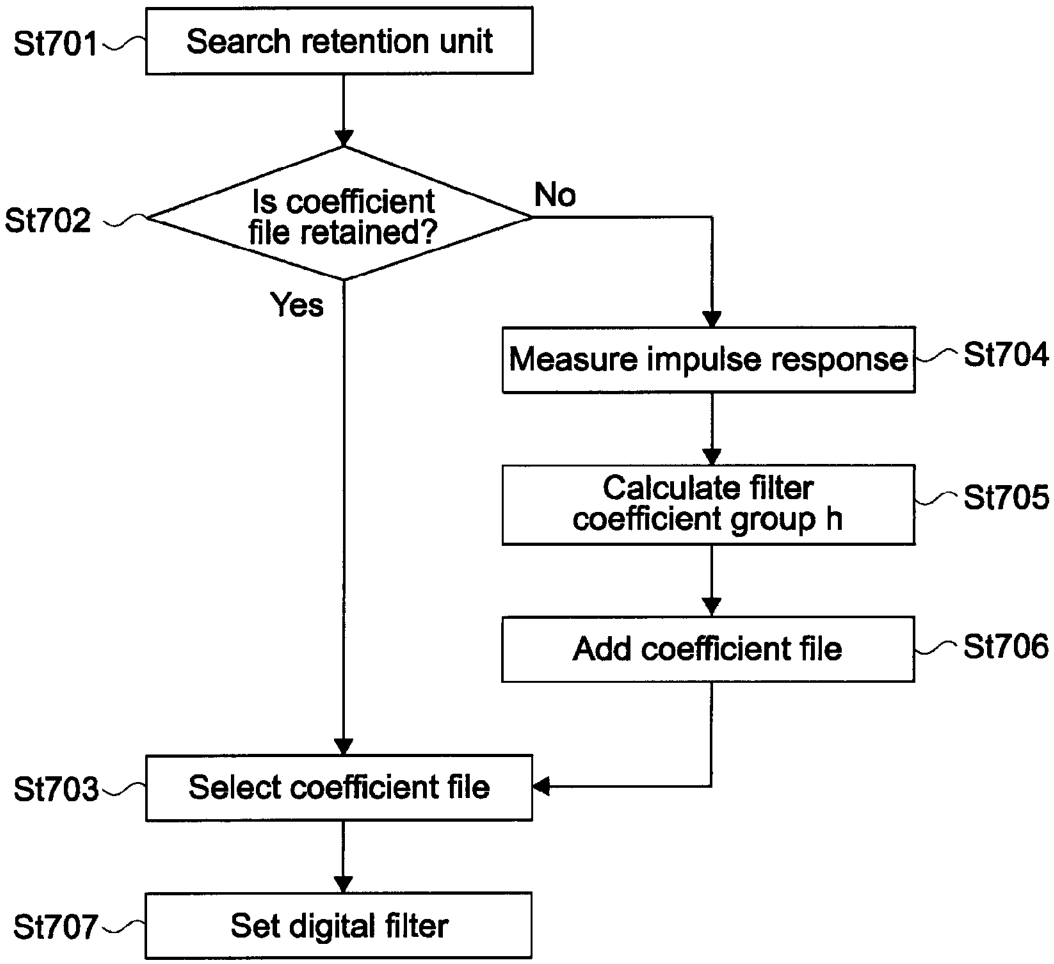
FIG. 26 is a flowchart showing operations of the audio signal processing apparatus according to the seventh embodiment.

FIG. 26 is a flowchart showing operations of the audio signal processing apparatus.

As shown in FIG. 26, when the speaker S is connected to the output unit 4, the coefficient setting unit 6 searches the retention unit 5 to check whether a coefficient file of a speaker model corresponding to the speaker S is retained (St701). If a coefficient file of the speaker S is retained in the retention unit 5 (St702: Yes), the coefficient setting unit 6 selects that coefficient file (St703). If a coefficient file of the speaker S is not retained in the retention unit 5 (St702: No), the coefficient setting unit 6 measures an impulse response of the speaker S (St704). The coefficient generation unit 21 calculates a filter coefficient group h of the speaker S based on the measured impulse response (St705), and adds a coefficient file including the filter coefficient group h to the retention unit 5 (St706). The coefficient setting unit 6 then selects the added coefficient file (St703).

The coefficient setting unit 6 sets the filter coefficient group h included in the coefficient file selected in St703 in the signal processing unit 3 (St707). When an instruction to reproduce audio is issued, the audio signal processing apparatus performs correction processing on an audio signal in the signal processing unit 3 with use of the filter coefficient group h included in the coefficient file to output audio from the speaker S.

As described above, in this embodiment, even when a speaker whose coefficient file is not retained in the retention unit 5 is connected to the audio signal processing apparatus 20, the audio signal processing apparatus 20 can add a coefficient file of that speaker to the retention unit 5. Accordingly, even when a speaker whose coefficient file is not retained in the retention unit 5 is connected to the audio signal processing apparatus 20, the audio signal processing apparatus 20 can correct speaker characteristics of that speaker.

Eighth Embodiment

An eighth embodiment of the present disclosure will now be described.

In the eighth embodiment, the same structures as those in the first and seventh embodiments are denoted by the same reference symbols and description thereof will be omitted.

An audio signal processing apparatus according to this embodiment is identical to that of the first embodiment in that the coefficient setting unit 6 selects a filter coefficient group h corresponding to a model of a speaker to be connected to the output unit 4 from the retention unit 5, and uses the filter coefficient group h for correction processing in the signal processing unit 3. However, the audio signal processing apparatus according to this embodiment is different from the audio signal processing apparatus 1 according to the first embodiment in that the audio signal processing apparatus associates a connected speaker with a similar coefficient file retained in the retention unit 5.

[Association of Coefficient File]

When a speaker S whose coefficient file is not retained in the retention unit 5 is connected to the audio signal processing apparatus 20, the audio signal processing apparatus 20 outputs a test signal from the output unit 4 to the speaker S. The test signal may be the impulse signal described above. The microphone 22 collects the audio output from the speaker S by the test signal, and transmits the audio to the coefficient generation unit 21.

The coefficient generation unit 21 calculates a filter coefficient group h from the audio (impulse response) collected by the microphone 22. The filter coefficient group h can be calculated by the above-mentioned method. Next, the coefficient generation unit 21 compares the calculated filter coefficient group h with filter coefficient groups h included in coefficient files of various speakers that are retained in the retention unit 5. Then, the coefficient generation unit 21 further associates a new speaker with a coefficient file including a filter coefficient group h having the highest similarity. Here, "to associate" is to change a coefficient file corresponding to an existing speaker so as to support an additional new speaker.

[Operation of Audio Signal Processing Apparatus]

Operations of the audio signal processing apparatus according to this embodiment will now be described.

Figure 27:
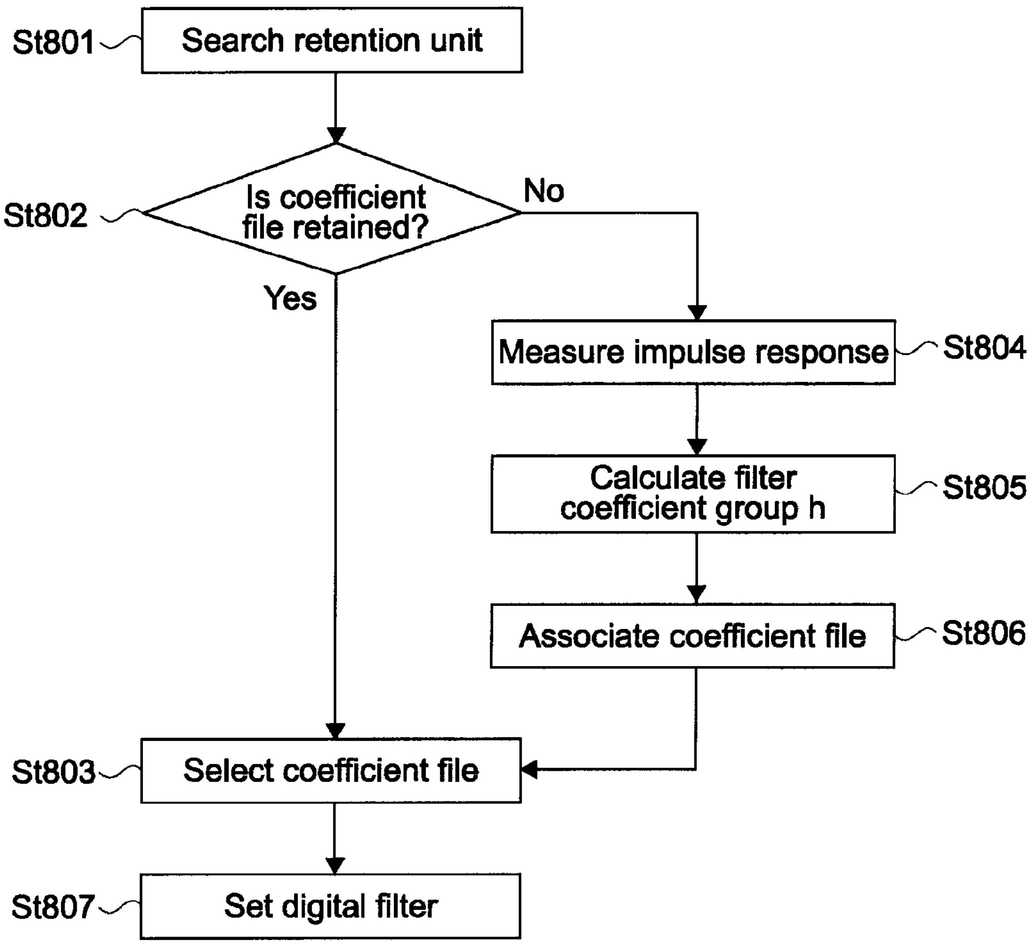
FIG. 27 is a flowchart showing operations of an audio signal processing apparatus according to an eighth embodiment of the present disclosure.

FIG. 27 is a flowchart showing operations of the audio signal processing apparatus.

As shown in FIG. 27, when the speaker S is connected to the output unit 4, the coefficient setting unit 6 searches the retention unit 5 to check whether a coefficient file of a speaker model corresponding to the speaker S is retained (St801). If a coefficient file of the speaker S is retained in the retention unit 5 (St802: Yes), the coefficient setting unit 6 selects that coefficient file (St803). If a coefficient file of the speaker S is not retained in the retention unit 5 (St802: No), the coefficient setting unit 6 measures an impulse response of the speaker S (St804). The coefficient generation unit 21 calculates a filter coefficient group h of the speaker S based on the measured impulse response (St805). Next, the coefficient generation unit 21 compares the calculated filter coefficient group h with filter coefficient groups h included in coefficient files of various speakers that are retained in the retention unit 5, and associates a new speaker with a coefficient file including a filter coefficient group h having the highest similarity (St806). The coefficient setting unit 6 selects the added coefficient file (St803).

The coefficient setting unit 6 sets the filter coefficient group h included in the coefficient file selected in St803 in the signal processing unit 3 (St807). When an instruction to reproduce audio is issued, the audio signal processing apparatus performs correction processing on an audio signal in the signal processing unit 3 with use of the filter coefficient group h included in the coefficient file to output audio from the speaker S.

As described above, in this embodiment, even when a speaker whose coefficient file is not retained in the retention unit 5 is connected to the audio signal processing apparatus 20, the audio signal processing apparatus 20 can associate a coefficient file of the speaker with a coefficient file retained in the retention unit 5. Accordingly, even when a speaker whose coefficient file is not retained in the retention unit 5 is connected to the audio signal processing apparatus 20, the audio signal processing apparatus 20 can correct speaker characteristics of that speaker. Here, since an existing coefficient file is used as a coefficient file of a new speaker and a coefficient file of the new speaker is not retained in the retention unit 5, the capacity of the retention unit 5 can be saved.

The present disclosure is not limited to the embodiments described above, and can be variously changed without departing from the gist of the present disclosure.

In the embodiments described above, the signal processing unit 3 corrects speaker characteristics of a speaker. In addition thereto, the signal processing unit 3 can perform, on an audio signal, correction processing adding acoustic processing such as virtual sound image localization.

The present disclosure contains subject matter related to that disclosed in Japanese Priority Patent Application JP 2010-126798 filed in the Japan Patent Office on Jun. 2, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal processing apparatus, comprising:

a signal processing unit configured to perform signal processing on an audio signal by a digital filter;

an output unit configured to be connected to an external speaker and output the audio signal to the external speaker;

a retention unit configured to retain a plurality of filter coefficients that are impulse responses having reverse characteristics of a plurality of speakers having different speaker characteristics, and configured to retain a coefficient length that corresponds to each of the plurality of the speakers; and a coefficient setting unit configured to select filter coefficients from the plurality of filter coefficients, that correspond to the external speaker connected to the output unit, based on the coefficient length, and configured to set the filter coefficients in the digital filter, wherein the coefficient length for an audio signal in a first frequency band is larger than the coefficient length for an audio signal in a second frequency band, and wherein frequencies in the first frequency band are smaller than frequencies in the second frequency band, wherein the retention unit is configured to retain channel number information that corresponds to each of the plurality of speakers and indicates a channel number, and the coefficient setting unit is configured to refer to the channel number information to set the filter coefficients in the digital filter, wherein the channel number information indicates whether a speaker from the plurality of speakers is stereo or monaural.

2. The audio signal processing apparatus according to claim 1, wherein the retention unit is configured to retain the coefficient length of each of the plurality of filter coefficients that corresponds to a reproducible frequency band of the plurality of speakers, and the coefficient setting unit is configured to refer to the coefficient length to set the filter coefficients in the digital filter.

3. The audio signal processing apparatus according to claim 1, wherein the coefficient setting unit is configured to refer to channel setting information to set the filter coefficients in the digital filter.

4. The audio signal processing apparatus according to claim 1, wherein the retention unit is configured to retain speaker identification information that corresponds to each of the plurality of speakers and is associated to each model of the plurality of speakers, and the coefficient setting unit is configured to set, in the digital filter, the filter coefficients of the external speaker to which the speaker identification information corresponding to other information is assigned, wherein the other information, acquired from the external speaker connected to the output unit, indicates a model of the external speaker.

5. The audio signal processing apparatus according to claim 1, wherein the coefficient setting unit is configured to refer to the coefficient length to set the filter coefficients in the digital filter.

6. The audio signal processing apparatus according to claim 1, further comprising:

a test signal output unit configured to output a test signal to the external speaker connected to the output unit;

an audio collection unit configured to collect audio output from the external speaker by the test signal; and a coefficient generation unit configured to generate the filter coefficients corresponding to the external speaker from the audio output collected by the audio collection unit and retain the filter coefficients in the retention unit.

7. The audio signal processing apparatus according to claim 1, further comprising:

a test signal output unit configured to output a test signal to the external speaker connected to the output unit;

an audio collection unit configured to collect audio output from the external speaker by the test signal; and a coefficient generation unit configured to generate the filter coefficients corresponding to the external speaker from the audio output collected by the audio collection unit and associate the external speaker with one filter coefficient having a highest similarity from the plurality of filter coefficients retained in the retention unit.

8. The audio signal processing apparatus according to claim 1, wherein the retention unit is configured to retain a coefficient word length that corresponds to each of the plurality of the speakers, wherein the coefficient word length indicates 16 bits or 32 bits in a filter coefficient of a speaker.

9. An audio signal processing method, comprising:

measuring impulse responses of a plurality of speakers having different speaker characteristics;

retaining a plurality of filter coefficients obtained from the impulse responses while associating the plurality of filter coefficients with the plurality of speakers;

retaining a coefficient length that corresponds to each of the plurality of the speakers; and selecting filter coefficients from the plurality of filter coefficients, that correspond to a connected speaker, based on the coefficient length, to set the filter coefficients in a digital filter, and apply the filter coefficients to an audio signal, wherein the coefficient length for an audio signal in a first frequency band is larger than the coefficient length for an audio signal in a second frequency band, and wherein frequencies in the first frequency band are smaller than frequencies in the second frequency band, wherein the retention unit is configured to retain channel number information that corresponds to each of the plurality of speakers and indicates a channel number, and the coefficient setting unit is configured to refer to the channel number information to set the filter coefficients in the digital filter, wherein the channel number information indicates whether a speaker from the plurality of speakers is stereo or monaural.

* * * * *